(12) United States Patent
Caruso

(10) Patent No.: US 12,016,489 B2
(45) Date of Patent: Jun. 25, 2024

(54) COOKING APPLIANCES

(71) Applicant: Steven Jerome Caruso, Antioch, IL (US)

(72) Inventor: Steven Jerome Caruso, Antioch, IL (US)

( * ) Notice: Subject to any disclaimer, the term of this patent is extended or adjusted under 35 U.S.C. 154(b) by 194 days.

(21) Appl. No.: 17/392,993

(22) Filed: Aug. 3, 2021

(65) Prior Publication Data

US 2022/0095833 A1    Mar. 31, 2022

Related U.S. Application Data

(60) Provisional application No. 63/173,467, filed on Apr. 11, 2021, provisional application No. 63/061,119, filed on Aug. 4, 2020.

(51) Int. Cl.
*A47J 37/06* (2006.01)
*A47J 36/06* (2006.01)

(52) U.S. Cl.
CPC .......... *A47J 37/0641* (2013.01); *A47J 36/06* (2013.01)

(58) Field of Classification Search
None
See application file for complete search history.

(56) References Cited

U.S. PATENT DOCUMENTS

2016/0150915 A1 * 6/2016 Yu et al. ............... A47J 44/02

FOREIGN PATENT DOCUMENTS

| CA | 2217673 A1 | * | 9/1998 | ............ B01D 1/0082 |
| CN | 108463148 A | * | 8/2018 | ............ A47J 43/046 |
| CN | 109996476 A | * | 7/2019 | ............ A47J 43/0772 |
| CN | 210354396 U | * | 4/2020 | ............ A47J 37/06 |
| KR | 20190012259 A | * | 2/2019 | ............ A47J 27/002 |
| KR | 20200018026 A | * | 2/2020 | ............ H05B 6/06 |

OTHER PUBLICATIONS

Machine translation of CA 2217673 A1 performed on Jun. 27, 2023, Belongia (Year: 1998).*
Machine translation of CN 109996476 A performed on Jun. 27, 2023, Gill et al. (Year: 2019).*
Machine translation of CN 210354396 U performed on Jun. 27, 2023, Guo (Year: 2020).*
Machine translation of KR 20190012259 A performed on Jun. 28, 2023, Maravic (Year: 2019).*
Machine translation of CN 108463148 A performed on Nov. 21, 2023, De Longhi et al. (Year: 2018).*
Machine translation of KR 20200018026 A performed on Nov. 21, 2023, Kim (Year: 2020).*

* cited by examiner

*Primary Examiner* — Dana Ross
*Assistant Examiner* — Kevin Guanhua Wen

(57) ABSTRACT

New and novel structures and ways to cook and serve foodstuffs have been disclosed. The items may be "foodstuffs" or other perishable items. The structure or method may include a means and methods to cook the food more evenly, more food concurrently and allow the user to see the food better as it is cooking and serve the food in the vessel it was cooked in, thus making fewer items to manipulate and clean.

3 Claims, 37 Drawing Sheets

Figure 1:
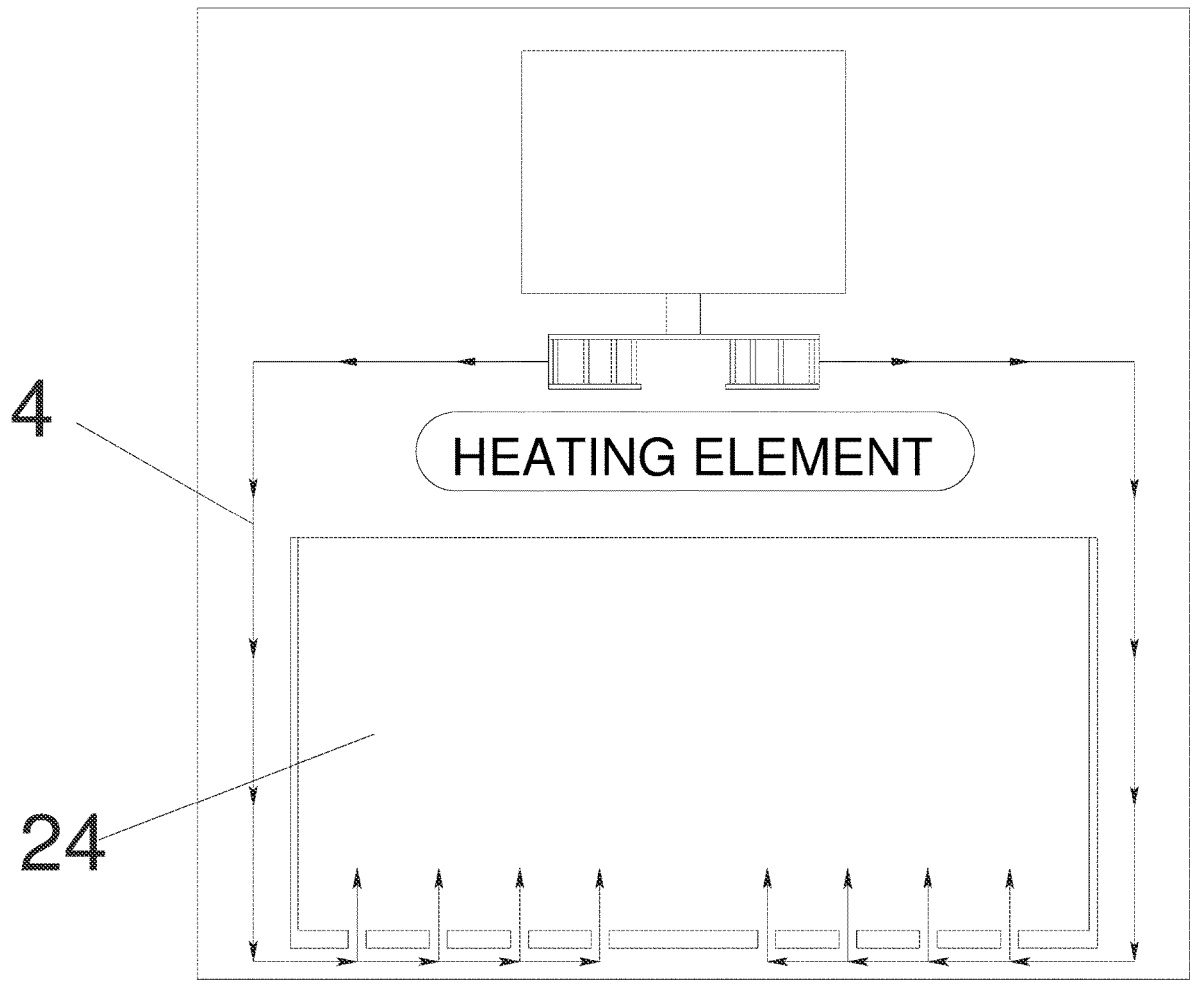

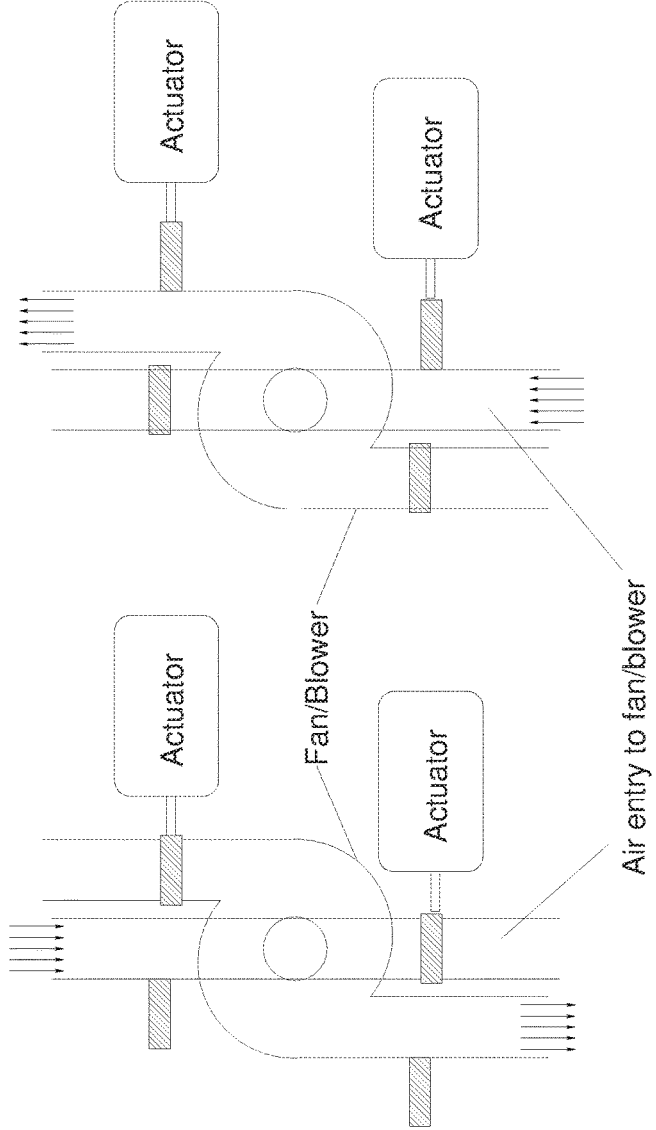
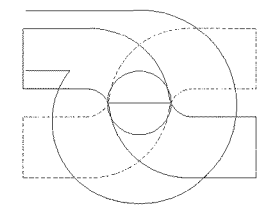
Figure 27  Figure 28  Figure 29

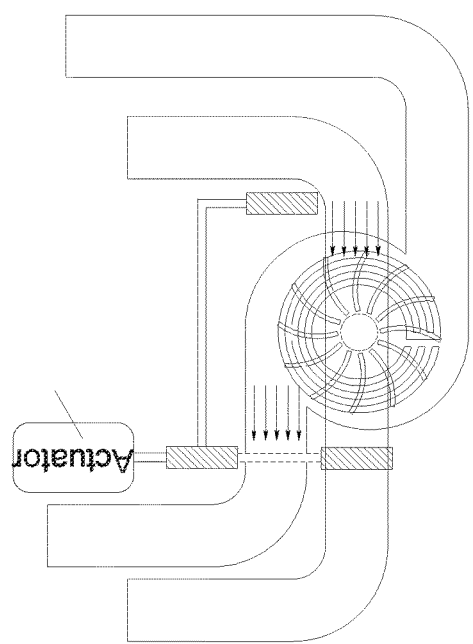
Figure 33-A
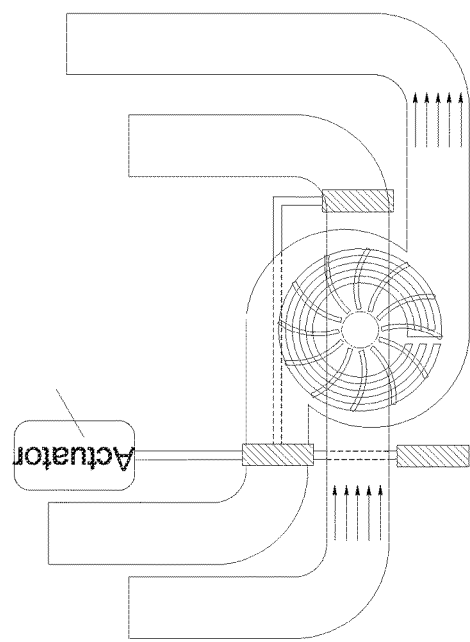
Figure 33-B

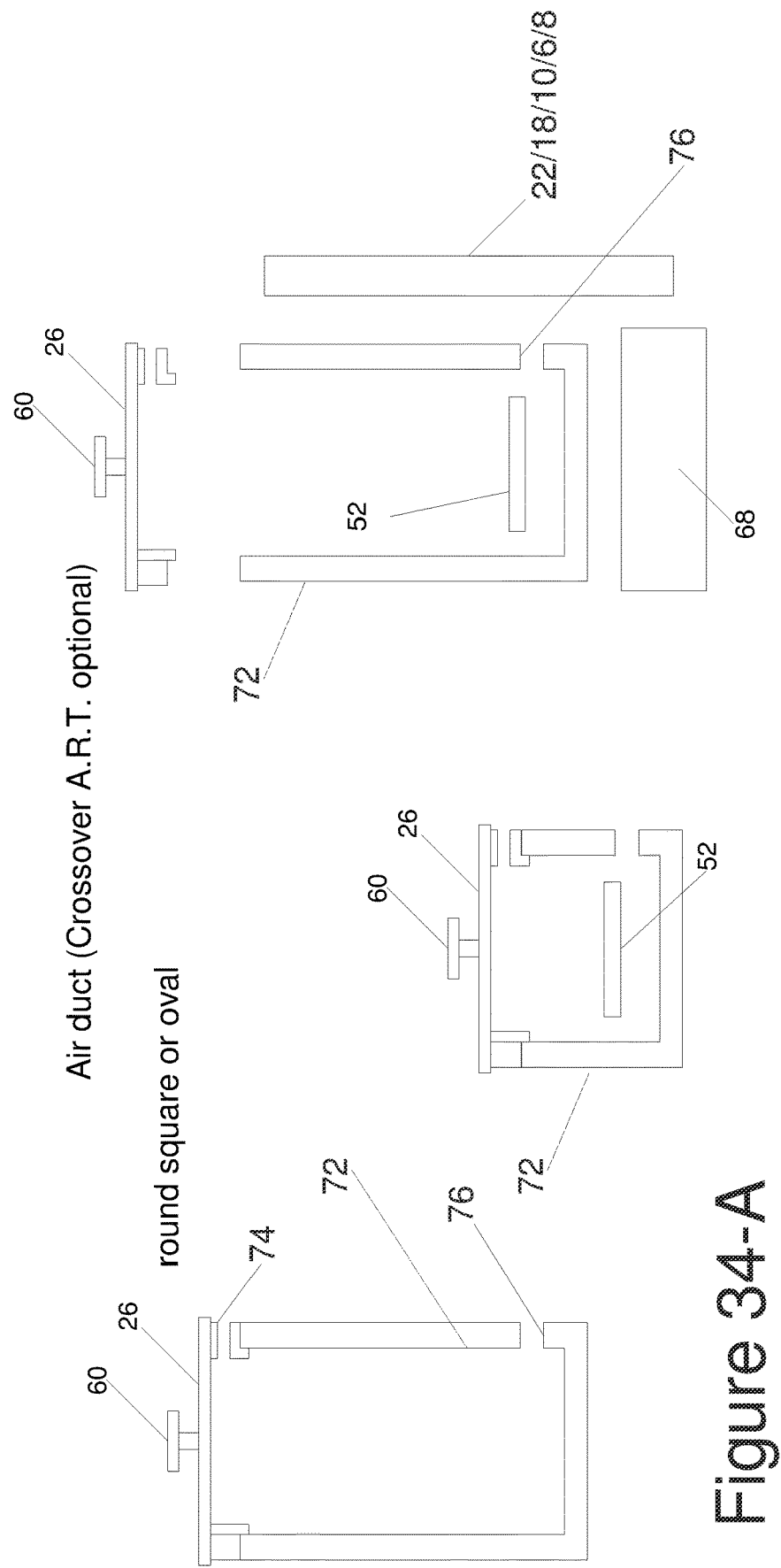

Pressure cooker with valve(s) to tower interface

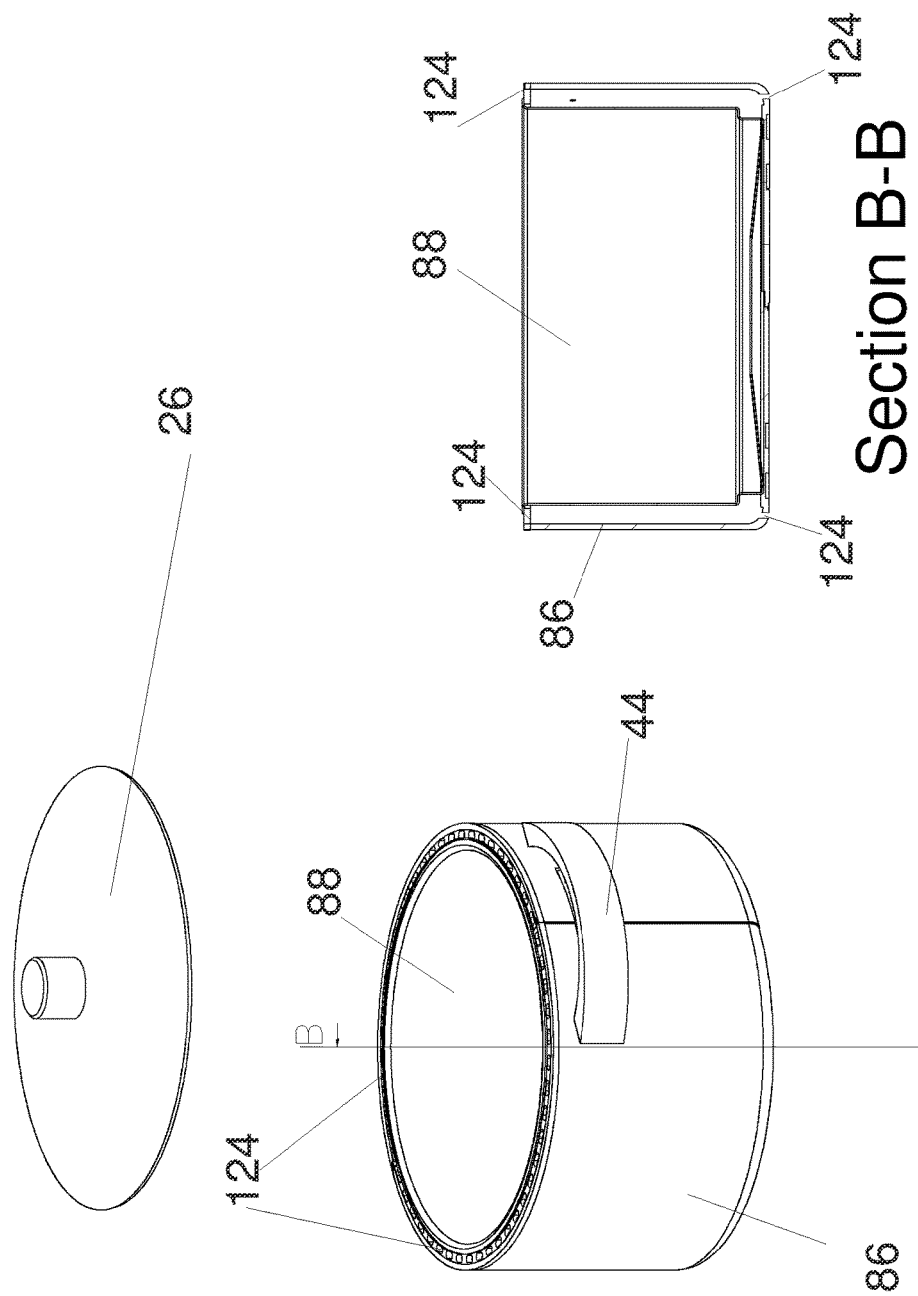

COOKING APPLIANCES

RELATED APPLICATIONS

NONE

FEDERALLY SPONSORED RESEARCH OR DEVELOPMENT

[Not Applicable]

MICROFICHE/COPYRIGHT REFERENCE

[Not Applicable]

RELATED APPLICATIONS

This application claims the benefit of U.S. provisional application 63/061,119 filed Aug. 4, 2020 and U.S. provisional application 63/173,467 filed Apr. 11, 2021 both of which are incorporated by this reference in their entirety. The entire disclosure of the above, and each application referred to in this paragraph of listed patent applications and their entire prosecution history to date is/are hereby incorporated herein by reference in its/their entirety.

BACKGROUND OF THE INVENTION

The present invention relates to devices used to heat and thereby often "cook" or "prepare" various foodstuffs.

BRIEF SUMMARY OF THE INVENTION

The present invention relates to devices used to heat various foodstuffs and is directed at ovens, cookers, air fryers, induction hot-plates and pressure cookers. Disclosed are a plurality of new structures and resultant formats with new processes, yielding new results and new experiences for the user. The structure or method may include a means and methods to cook the food more evenly, more food concurrently and/or allow the user to see the food better as it is cooking and serve the food in the vessel it was cooked in, thus making fewer items to manipulate and clean.

DETAILED DESCRIPTION OF THE INVENTION

While the invention will be described in connection with several preferred embodiments, it will be understood that the invention is not limited to these embodiments. On the contrary, the invention includes all alternatives, modifications, combinations, and equivalents as may be included within the spirit and scope of the appended claims.

Referring to the figures; the following reference characters are used in the drawings of refer to the parts of the present invention. Like reference characters indicate like or corresponding parts in the respective views.

2—Main unit structure
4—Air Path
6—Air Path
8—Air Path
10—Air duct
12—Air duct within a movable food prep container
14—Wall
16—Wall
18—Heating element
20—Fan
22—Fan
24—Cooking Vessel
26—Lid of 24/72
28—Vent
30—Drawer
32—Drawer
34—Drawer
36—Drawer/Basket
38—Drawer/Basket
40—Drawer/Basket
42—Heat Shield and/or Air Guide
44—Handle
46—Release of bottom wall of food support/basket/and/or food serving dish
48—Basket
50—Bottom wall of food support/basket/cooking vessel
52—food support/and/or food serving dish
54—Air Guide on food support surface
56—Aperture of 50
58—Grease tray/catch of 50
60—Handle of 26
62—Air path aperture(s)
64—Motor
66—Aperture(s)
68—Base Unit which may also include an induction generator, halogen heating, resistive heating or other cooktop/hob heating technology/elements.
70—Air flow continuity flange
72—Removable/Dockable cooking vessel
74—Upper docking-duct/aperture
76—Lower docking-duct/aperture (not presently shown)
78)—Actuator, manual-user operated or electro-mechanical
80—User input and system feedback controls such as desired time and temperature, actual time left and temperature, etc.
82—First air path in or out of lid
84—Second air path in or out of lid
86—Outer structure of cooking structure
88—Inner bowl of cooking structure
90—Remote "Beacon" a status indicator of time and temperature, actual time left and temperature, etc. Several structural embodiments are described.
92—Docking port of Remote Status-Beacon of 90
94—inclined ramps
96—Pivots of 94
98—Motor to drive a fan(s)
100—Shafting
102—Bevel gearing
104—Pulleys
106—timing belts/belts/chain drive
108—support posts/mechanical guide elements/vertical support structure
110—Pressure indicator/relief valve
112—Pressure valve
114—Hood area
116—Elevated food support
118—Unit mounted time and temp input (knobs/buttons) and digital feedback display
120—Shafting
122—Base of unit
124—Vent holes/apertures
126—Cut out/portion of cantilever Current Problems with Various Cooking Appliances:
A problem with air Fryers is having to shake stir return for even cooking.

Some manufacturers have tried to integrate mechanical stirrers into their products which have various problems from being space intensive to being destructive to the structure of the food itself.

To address this need in a new and unique manner, selected embodiments of the invention at hand innovatively uses a reverse airflow technology.

Another problem with air dryers, ovens, pressure cookers and other food preparation devices is making more than one type of foodstuff simultaneously.

Advantages of separate units/zones include:
1) Cooking at different temperatures of different foodstuffs simultaneously.
1) Elimination of cross contamination of flavor
2) no co-mingling of individual small pieces that would have to be sorted on a plate later
3) Reduction in drippings/and thus smoke burn off etc.
4) Different types of cooking, i.e. steam versus dry To address this need; selected embodiments of the invention of hand inventively creates smaller units (stackable or side by side) that can be ganged together mechanically or electrically and still fall under the wattage of one outlet. Smaller units also have the ability to single stack more items must cooking them were evenly.

A problem with many airfyers/and ovens pressure cookers and other food preparation devices is the inability to see what you're cooking. Also a problem is having to clean both the other air fryer and the plate is served upon.

Selected embodiments of the invention at hand structurally addresses this problem from new drop plate/drop/dispense of a "plated" configurations and structures to new formats and materials used for the cooking vessel(s).

Another problem is the lack of diversity of vessel sizes that may be used with air fryers, ovens and pressure cookers. Selected embodiments of the invention at hand structurally addresses this problem.

Another problem with pressure cookers is lack of control of venting. Selected embodiments of the invention at hand structurally addresses this problem.

Another problem with many appliances is that they actually discourage regular cleaning as the vessel of the appliance is not viewed as a "dish" or a pan . . . to be cleaned after every use . . . but rather a rack of a toaster oven. Another problem with many appliances is that they do not enble it so the user can serve pr dine in the very dish they prepared in. Another problem with many appliances is the inability to see the food as it cooks without having to open drawer or stoop to look through a window. So disclosed herein is a completely new functional layout and ergonomic user experience by enabling the user to actively view and/or access the foodstuffs being cooked, analogous to a fry pan (with a clear lid) or equivalent, without having to stoop to look through a window/door or having to open a closed drawer, as well as being able to manipulate the cooking vessel with side handles etc. Another problem with many appliances is that they are limited in functions. Selected embodiments of the invention at hand structurally addresses these as well as other problems.

Now referring to FIG. 1. FIG. 1 is a front sectional view through a cooking device where the air Path 4, goes generally around cooking vessel 24. This is a guided path where the air radiates outward from the (most usually centrifugal) fan and is guided downward and then up through the bottom of the food holding basket as the fan (centrifugal) draws air from its general center. This is efficient in getting the air to the bottom of the basket, however actually results in the bottom of some foodstuffs being more cooked the top surface. This configuration also requires more space/less food basket area as there needs to be a duct radially around the food basket.

Figure 2:
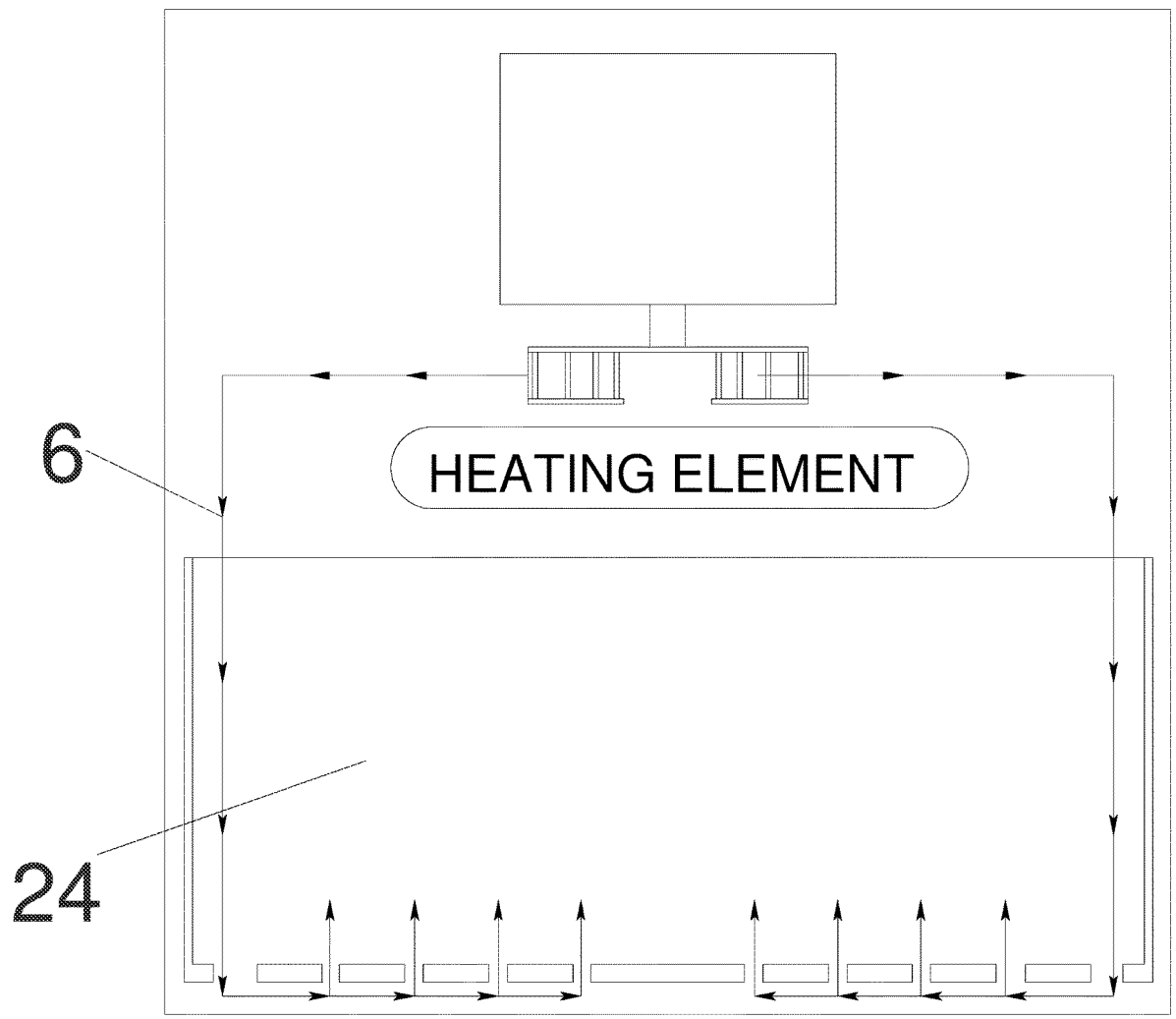

FIG. 2. FIG. 2 is a front sectional view through a cooking device where the air Path 6, goes generally through cooking vessel 24 making a rebound back up to through the food to be cooked in vessel 24. However, this is only the case if the food is very shallowly placed. Most of the air is just blowing around in a very unstructured, random manner from the top. This is efficient in getting the air to the top of foods in the basket, however actually results in the top of some foodstuffs being more cooked the top surface. The reason the air flow is referenced as "unstructured" in FIG. 2 unlike the "structured" path of FIG. 1, is that it is just blowing down on the basket/food hopper and when there is food in the basket/hopper it blocks the air from flowing through the basket/food and bouncing off the floor to return through the food from the underside.

Both of these are known configurations and are used here as illustrations of some airflow patterns contemplated and integrated into various new configurations and embodiments of cooking structures.

Figure 3:
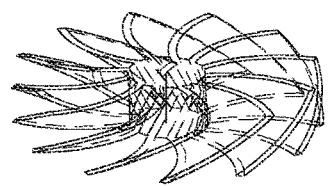

Now referring to FIG. 3. FIG. 3 is a trimetric view of a fan blade that is characterized as being axial or an airfoil type design. In several embodiments that use this type of fan a symmetrical orientation is used so that by reversing its rotation it goes from a pulling action to a pushing action with regard to air movement. It generally pulls error from one side of its blades and expels it directly through the blades in a straight manner parallel with its driving shaft.

Figure 4:
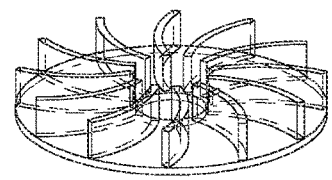

Now referring to FIG. 4. FIG. 4 is a trimetric view of a fan style is referred to as a radial or centrifugal, it is differentiated from that type of FIG. 3 in that it causes the air to be pulled in at its center generally parallel to its driving shaft, and expelled at generally at a 90° angle radially, or generally perpendicular to its driving shaft. The illustrations of the industry known, top down blowing air-fryer configurations of FIG. 1 and FIG. 2 employ a radial or centrifugal fan of this type.

Figure 5:
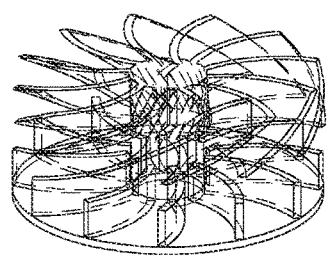

FIG. 5, illustrates the fan of FIG. 3 placed in an orientation in line with that of the fan of FIG. 4. Alternatively the fans could be adjacent to each other. This illustration is to show how several embodiments contemplate the use of two different types of fans within the same cooking structure in order to facilitate several new structural aspects and outcomes.

Figure 6:
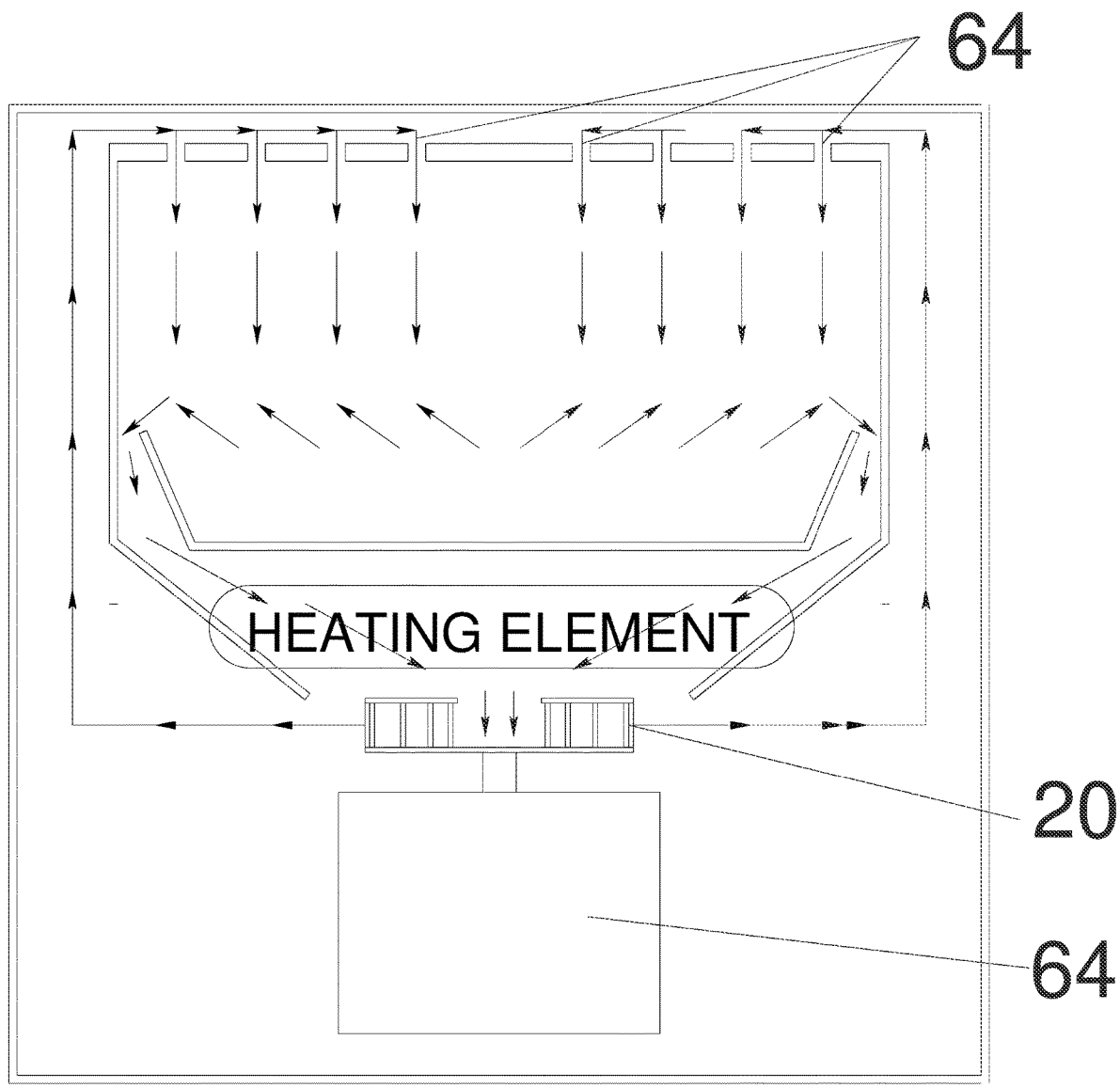

FIG. 6 is a front sectional elevation much like that of FIG. 1 and FIG. 2; however FIG. 6 shows a completely new configuration whereby the heating element, and the fans(s) are placed below the cooking chamber and food support; and additionally a completely air pattern has been created in order to accomplish this, and yet not pull in any of the liquids, or fats, into the fan that may be produced during the cooking process.

While all the embodiments may share and swap features from one another, one aspect of FIG. 6 should be emphasized. The top area contains apertures, 64, which aid in defusing and evening out the airflow at the top of the unit. This is equally applicable to all embodiments.

Figure 7:
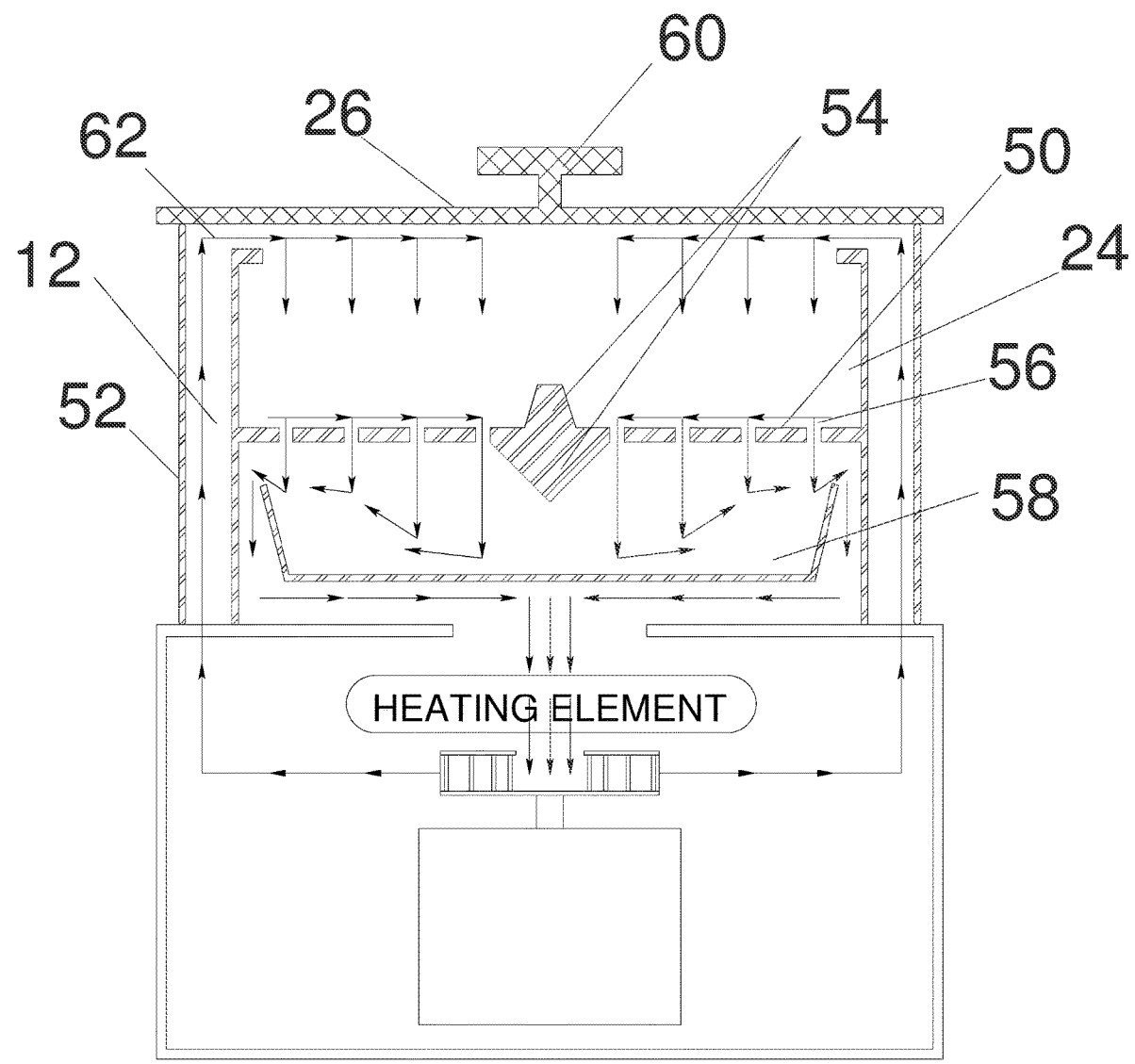

FIG. 7 has some similarities with FIG. 6, in that it is novel a bottom up configuration, however the entire upper chamber is now a removable cooking vessel that can be also used to serve and even store leftovers.

As a matter of record FIGS. 1, 2, and 8-19 all represent what would generally be referred to as "drawered" units that feature a removable basket, or "doored" units that feature shelves.

FIGS. 6 through nine are complete departure from the structural architecture of record yielding a completely new performance, new aesthetic and functionality for the consumer/user.

Figure 8:
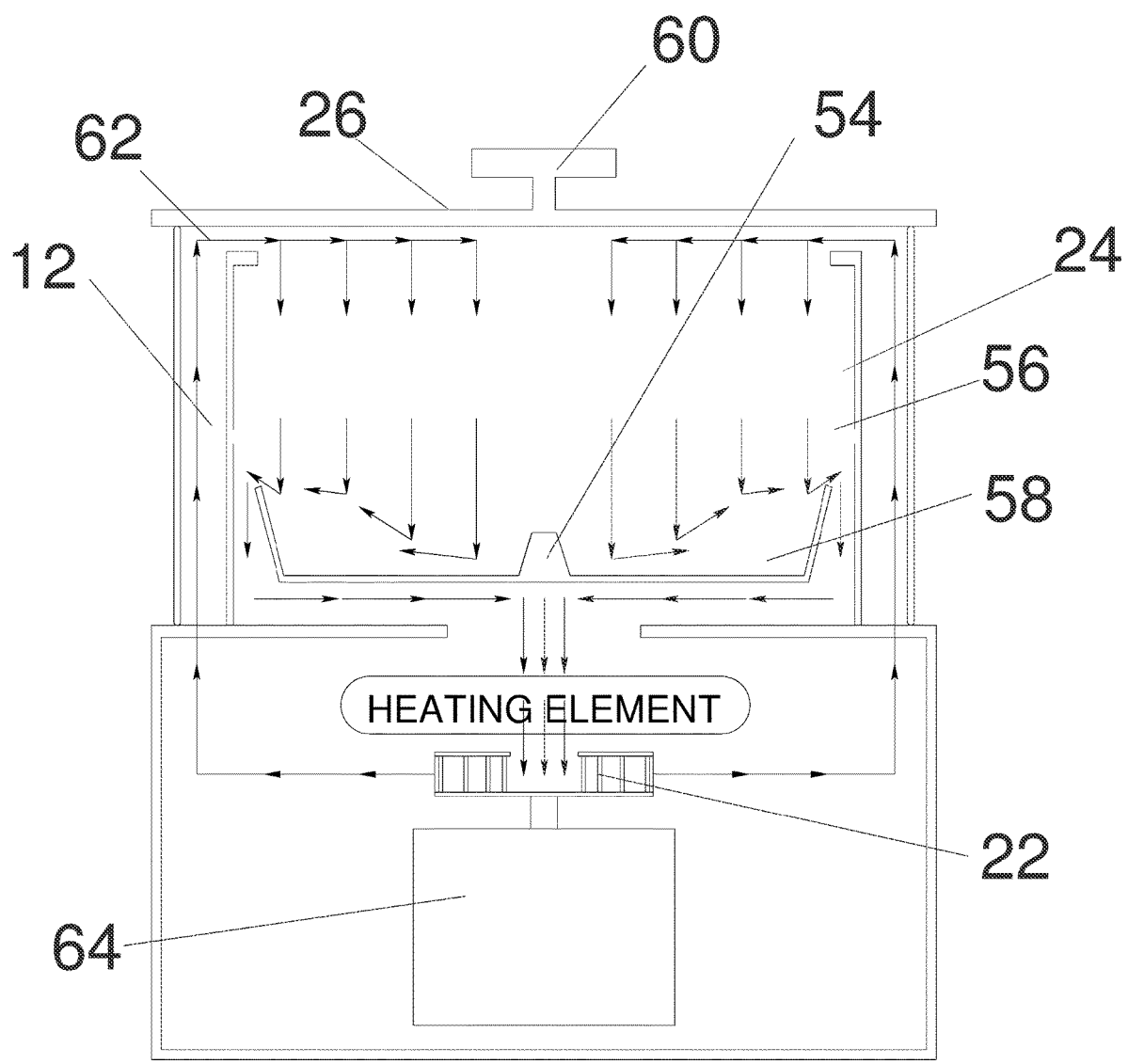

These features can be seen in FIGS. 6, 7 and 8;
50—Bottom wall of food support/basket/cooking vessel
52—food support/and/or food serving dish
54—Air Guide on food support surface
56—Aperture of 50
58—Grease tray/catch of 50
60—Handle of 26
62—Air path aperture(s) that are created within the cooking vessel itself.

In both FIGS. 6 and 7, as well as all the rest of the illustrations and associated embodiments; dual directional airflow is one of the inventive goals in order to provide a more even cooking of product than has been achieved with known structures. As such, the directional arrows are illustrative of one direction of airflow; it should be appreciated that the opposite direction of airflow the cycling of which is the goal of many embodiments would be illustrated by having the same arrows of airflow simply moving in the opposite direction.

Referring now to FIG. 8, and embodiments that shares some similarities with that of FIG. 7 can be seen. The embodiment of FIG. 8 though, shows an alternative airflow scenario.

Figure 9:
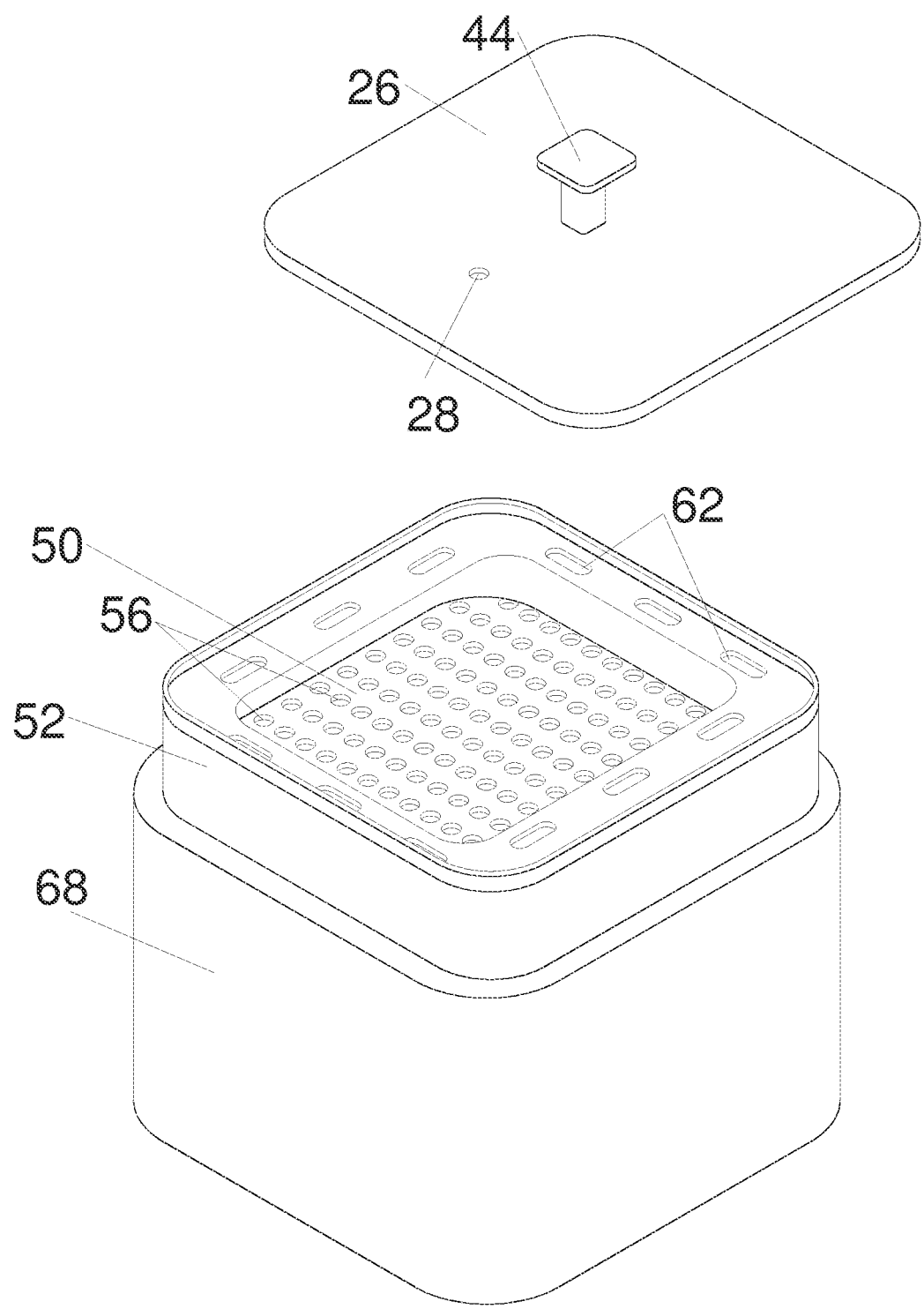

Now referring to FIG. 9 a trimetric of the embodiments of FIGS. 7 and eight can be seen. It can be seen that the top of vessel 68 which sits upon 68-Base Unit, is not only removable but also contains much of the ducting and airflow features for the appliance to work. Additionally, this makes it all very easy and conducive to clean after every use. Traditional formats encourage the user to not clean after every use more akin to the usage patterns one would have with an oven.

This and other embodiments structurally achieve the goals set out in other areas of this disclosure overcoming the problems of existing solutions while at the same time creating a completely new format of functionality.

It is anticipated that in any of these embodiments whether they be top-down bottom-up or side to side lateral, that the various fan formats and rotations in element cycling may be incorporated.

Figure 10:
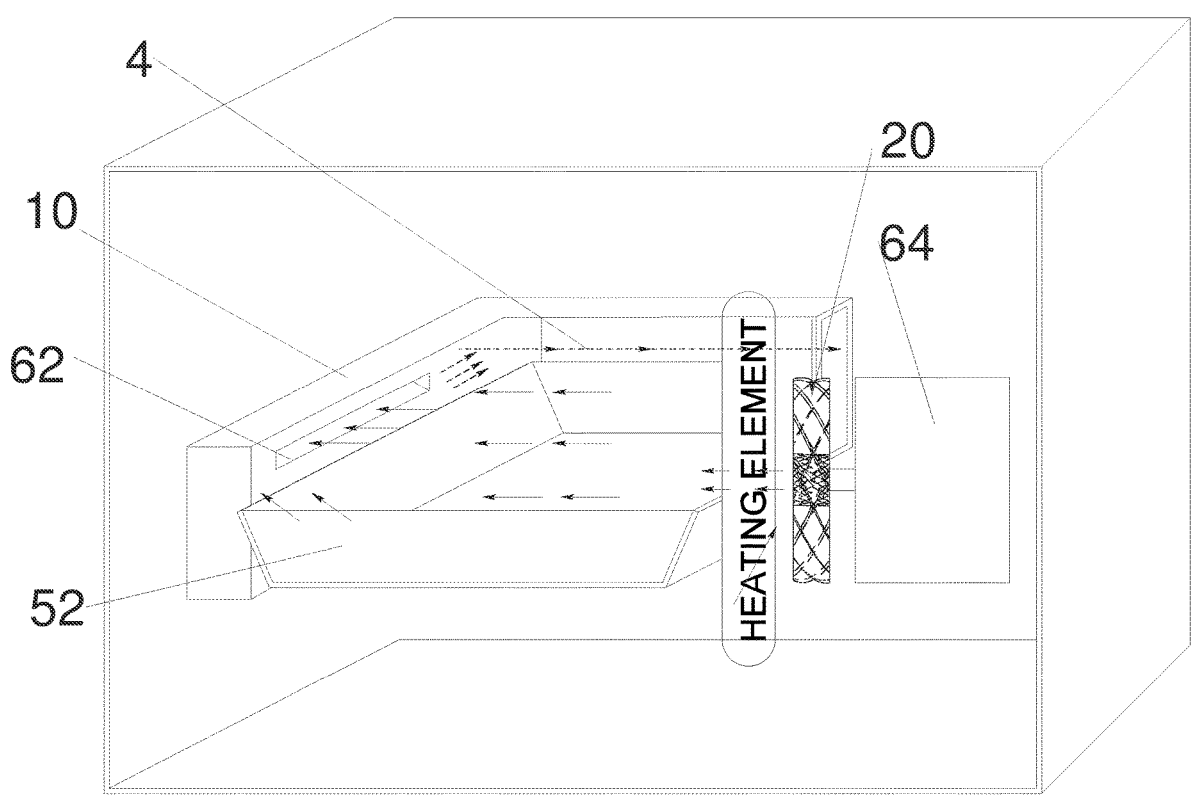
Figure 11:
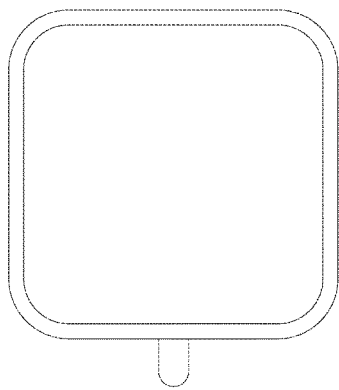
Figure 13:
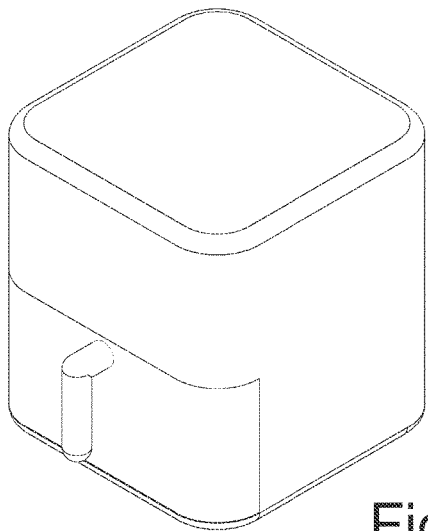
Figure 12:
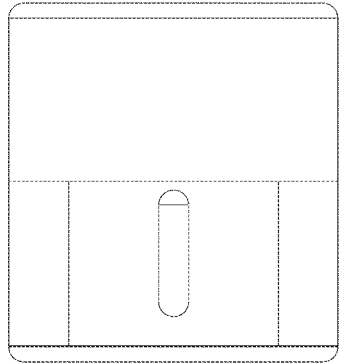
Figure 14:
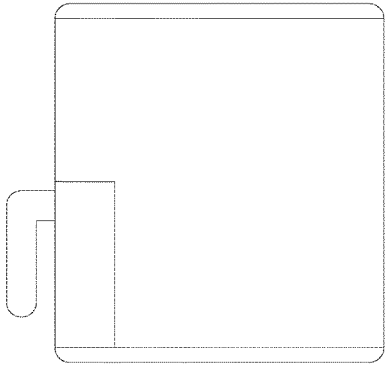
Figure 15:
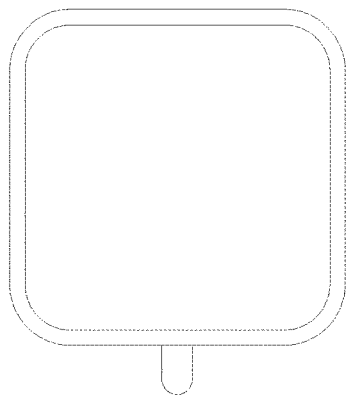
Figure 17:
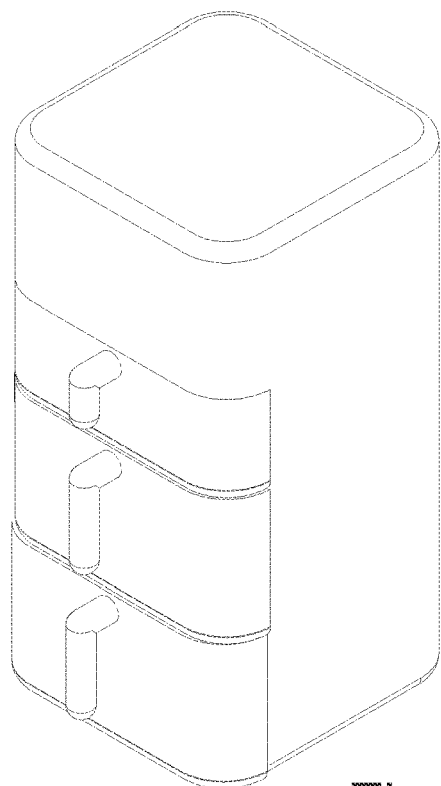
Figure 16:
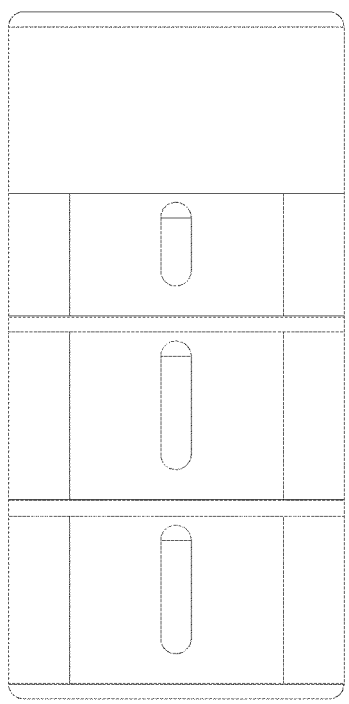
Figure 18:
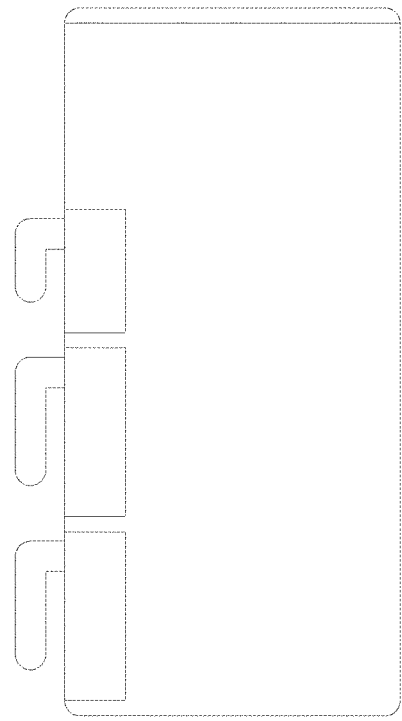
Figure 19:
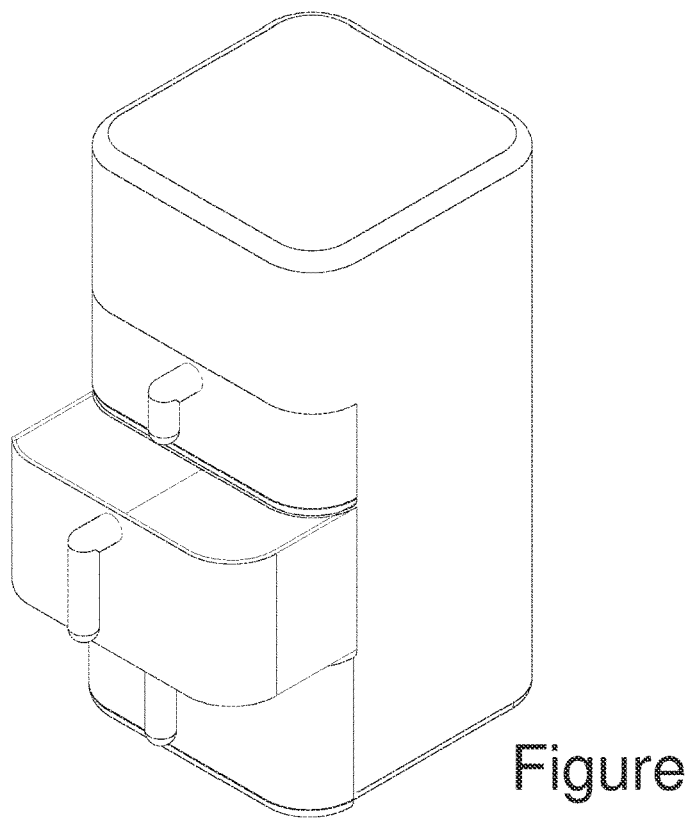

Referring now to FIG. 10, a lateral, doored (door removed/not shown for clarity) oven style air fryer/convection oven is depicted. Here it should be appreciated that the airflow is generally lateral or parallel to the ground and this could be side to side before to act relative to a given face of the unit. Units known in the industry of this type typically have the inflow for the fan on the same side as its outflow. This causes and has the shortcoming of creating a very small convective loop. FIG. 10 shows a new structure whereby the return duct, 10, with its aperture(s) 62, is in a position distal to that of fan 20. And so one side of the ductwork extends from one side of the food to the other—directly opposite (side wall to side wall/or back wall to front wall/door) Thus the air flow never turns 90 (generally) within the cooking chamber. This lack of turning with respect to the food being cooked represents a significant advance in evenness of cooking. And this is even more pronounced with air reversal structures as is disclosed in other parts of this disclosure. Additionally, in some novel embodiments this entire duct work is removable which makes it cleanable as areas of airflow tend to accumulate grease etc. in this way a complete convective loop can be created, and when optionally combined with an air reversal system as has been disclosed in other areas of the specification, a complete and even cooking of the foodstuffs can be attained in an unprecedented manner. Additionally this disclosure includes a toaster oven or an airfryer with a graphical user interface visually showing the heat/air flow and direction in a dynamic active way so that the user has the ability to selectively control air directional and thus manage/alter cooking parameters based upon results desired and throughout the process when they see that the top or bottom of the foodstuffs need to be cooked/browned more or less etc.

Referring to figures of 11 through 14, a typical top-down air fryer is illustrated for reference. These units have a door with shelves, or have a single drawer/basket that can be divided for different foodstuffs. As before disclosed these known configurations are limited in their ability to effectively and evenly cook food. Furthermore, many of the configurations are extraordinarily limited in the ability to cook more than one food type concurrently.

FIGS. 15 through 19 show a novel new approach to these problems. It can be seen in FIGS. 15 through 19 that multiple drawers are enabled. Making it so that the drawers may be dedicated to different foodstuffs and each drawer made even be sized differently.

Figure 20:
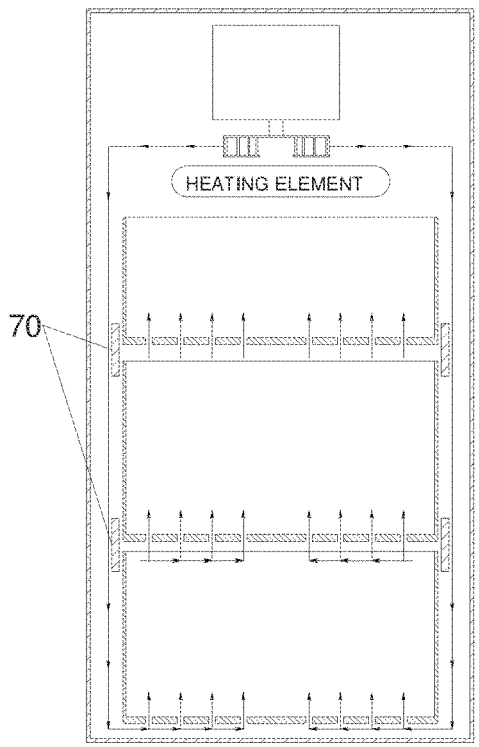
Figure 21:
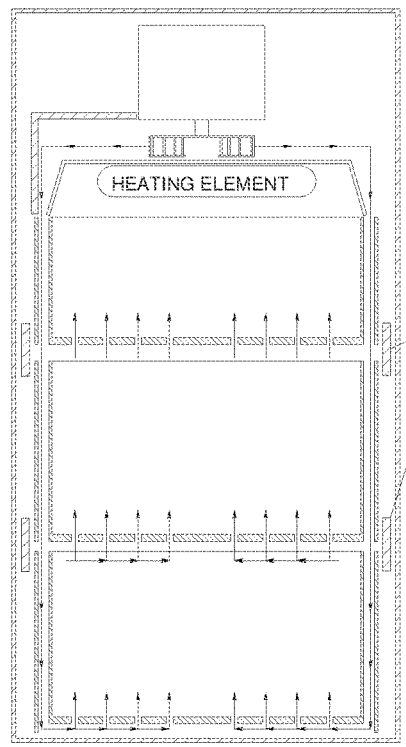

FIGS. 20 and 21 show front sectional elevation's of units that may be drawered or doored with shelves.

These figures serve to illustrate the challenges with multiple drawers/baskets, and the structures developed to overcome these challenges, one of which is airflow.

The airflow of FIG. 20 is generally through the peripheral area of the housing with 70-Air flow continuity flanges 70, helping to seal between each of the respective drawers.

This further illustrates the structural enablements of the embodiments of FIGS. 15-19 be they drawered or doored.

The airflow of FIG. 21 is generally through a peripheral ducted area created with in the drawers with 70, Air flow continuity flanges 70 helping to seal between each of the respective drawers/baskets.

Figure 22:
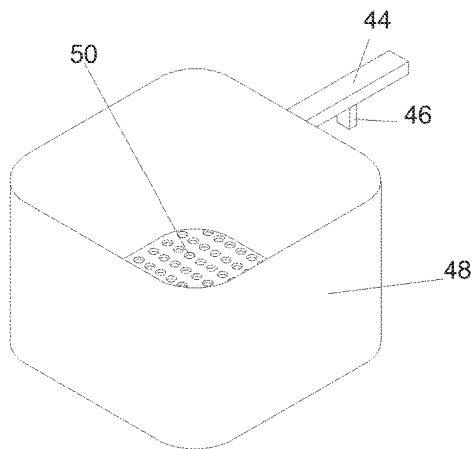
Figure 23:
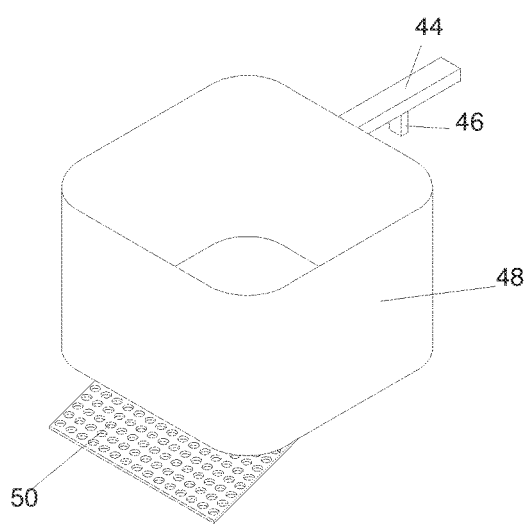
Figure 24:
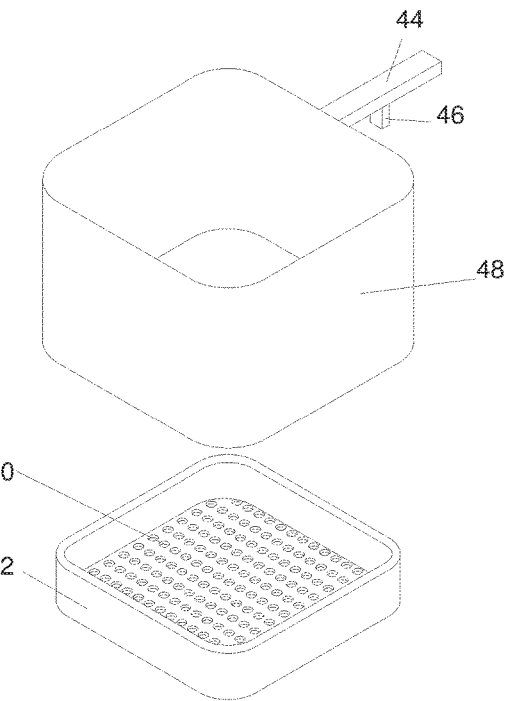
Figure 25:
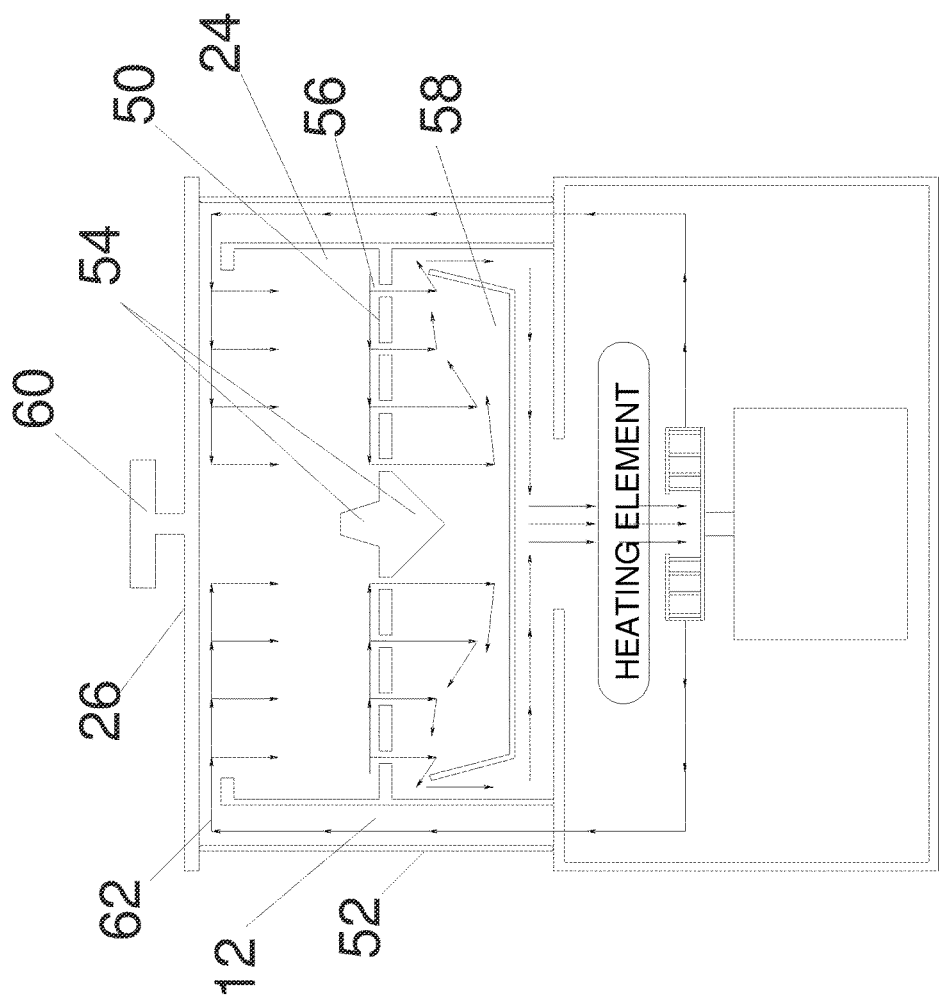

Referring now to FIGS. 22 through 24, a means of dispensing the cooked or processed product from a drawer/basket is disclosed. FIG. 22 is illustrative of the embodiment of FIG. 23 and the separate embodiment of FIG. 24 in a 1st position. This first position represents a cooking position.

Referring to FIG. 23 shows food support in a second position by way of food support release being activated by trigger 46, and food support 50 being released in a generally pivotal manner.

Similarly, referring to FIG. 24, it can be seen that food support 50 has been released by trigger 46. The difference between embodiment of FIGS. 23 and 24 is that the embodiment of FIG. 23 anticipates a structure for dispensing the foodstuff on to a separate plate etc., whereas FIG. 24 discloses a structure and illustrates the release of the bottom section which then creates a serving plate, platter, etc. which can then be washed separately, or even used to store the food in the refrigerator by covering with a dedicated lid, or foil etc.

Figure 26:
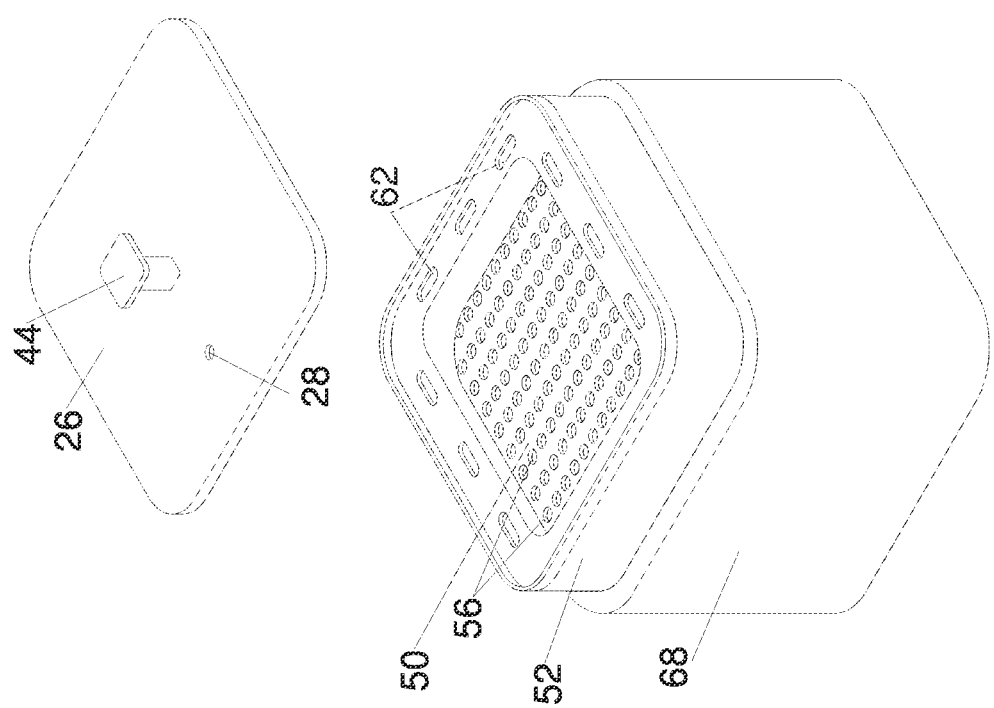

Referring to FIG. 26, disclosed is a bottom up configuration that shows structurally a base unit 68 and inserts or cooking vessels 52. Of note is this is a deeper dish than that of FIG. 9, showing how multiple dish types, and/or sizes of dishes may be used with a common base unit(s). May be bar coded, electrically chipped, tactily bumped, or coded in a plurality of ways to identify for different cooking sizes, paradigms etc.

Air Flow:

As stated an objective of the disclosed invention is to create a cooking system that reduces or eliminates the need to toss or stir food for even cooking. One way in which this device(s) accomplishes this is through unique air flow management structures and methods.

Air Reversal Technology A.R.T.

Reversible air flow and/or counter and/or and/or oscillating air-flow (Air Reversal Technology A.R.T.) Through:
1) dual fan structure (use of two stacked fans of two different types which also is structurally space efficient)
   a) shared motor/concentric axels/overrunning clutches—motor reverses for each fan
      Fan types:
      1) 2 centrifugal fans/impeller or
      2) 1 centrifugal and one radial/airfoil fan/impeller
      3) 2 axial, 1right hand and one left hand with overrunning clutches
      4) One dual directional pitch, reversible, axial Motors # and location
   a) 1 fan and/or motor at top that reverses and/or uses a clutch to activate only one fan impeller at a time.
   b) 2 fans and/or motors at top
   c) 2 fans and/or motors one on top one on bottom
   and/or A generally symmetrical radial/blade airfoil fan blade profile that can be rotationally reversed.

Another anticipated structure and method to achieve air flow switching/reversal is to go from guided, structured air-path air, as in FIG. 1, flow to unstructured air guided air flow as in FIG. 2.

Another preferred embodiment uses novel active ducting where there is structurally means for altering the ducting so that the air flow in and out of the respective in/out of the fans is effectively reversed, and thus the airflow throughout the rest of the structure, and thus vertically or horizontally through the foodstuffs, and so with static ducts the airflow through baskets/drawers/cooking vessels is effectively and selectively reversed. Such structures may convert a fan into a blower for one or the two modes/air-flow directions desired.

Figure 30:
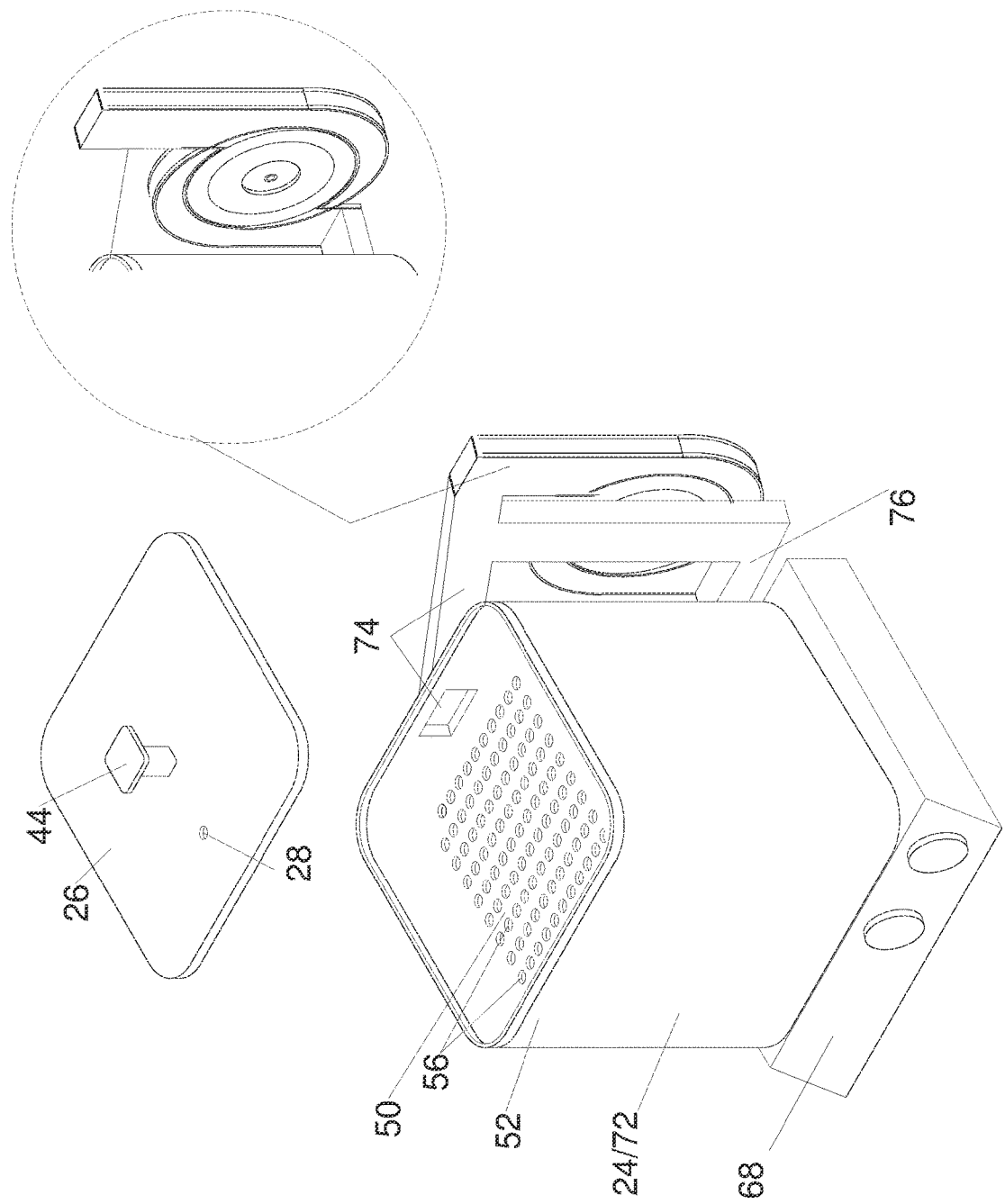

Thus now referring to FIGS. 27, 28, and 29. a fan style is referred to as a radial or centrifugal, is depicted in a ducted configuration that allows air flow to be reversible. By actuating the baffles (crosshatched) air flow is reversed from drawing from the top and blowing to the bottom of the vessel, depicted on the left in FIG. 27, to the reverse i.e drawing air into the fan/blower from the bottom and blowing onto the top of the cooking vessel. FIG. 29 shows another crossover structure that would have internal, active baffles. Referring to FIG. 30

A Plurality of pot/vessels/chambers and sizes to optimize cooking that can all fit onto a common base unit. The base unit may include heating element(s) of resistance style or an inductive/induction heating generator. This optimizes cooking of foodstuffs, declutters countertops or workspaces and introduces a paradigm to this segment of the appliance industry (air fryers and the like) which has far reaching implications. One of these is increased safety. Currently, people have an expectation that items such as a traditional pot or pans exterior is/gets hot during use. On counter top units such as toaster ovens, air fryers, counter grills and the like, the user has an expectation that the units exterior or housing does not get hop during use. However, this is just as often not the case as it is, and often is a variable or a spectrum of heat/danger values. The housing or rather the format does the user a disservice in creating a paradigm that creates an illusion of safety when it is actually safer to structurally create a vocabulary and messaging that communicates and operates in a manner familiar and predictable to the user. This is not to say or preclude the use of vessels or containers that may have insulative properties and thus stay "cool" or "cooler" to the touch. And so in FIG. 30 a dockable vessel(s) 72 may be used with a common power base 68. Air flow ducting may be structurally managed in the rear of the unit, and may employ air flow reversing schemes as has already been structurally described. Also seen in FIG. 30 is—Upper docking-duct/aperture 74 and there would be a Lower docking-duct/aperture (not presently shown) 76—for air flow.

Also Referring to FIG. 30, structured air flow that does not take the entirety of the peripheral and/or peripheral-vertical space of the cooking vessel will be disclosed and can be seen. One of the principal problems with existing units that utilize structured airflow is that they are extremely space inefficient. They require a radial fan to blow air into a duct disposed radially FULLY AROUND and then under (and then up through the food) the vessel that holds the foodstuff. Refer to FIGS. 1 and 2. This is why, despite the fact that structured air flow is superior in many ways, most units just use unstructured i.e. air blowing on the surface as it is much more efficient at space utilization. Referring to FIG. 30, disclosed are structures that uniquely achieve the best of both approaches. By using a directed air flow through a duct structurally created on a unitary side (in the depicted case, the rear) of the food holding vessel, and using a higher velocity air-stream through the duct, yet allowing the air flow to radiate once under or above the foodstuff, space may be maximized yet gain the benefits of directed/guided air flow. This capabilities of this are further magnified, even cooking, control over browning etc. when reversible air flow is structured into the device. And so the control of airflow can be altered and tailored for the cooking of specific items. I.e. one where as an upward air flow is used for primary cooking of the food product, and then where a top down convective oven/broiler style browning is desired for finishing. FIG. 30 is also representative of a unit that may have a heating element and (centrifugal) fan element disposed within side/rear saddle duct area lower-74 and associated detail area shown within "detail circle".

Figure 31:
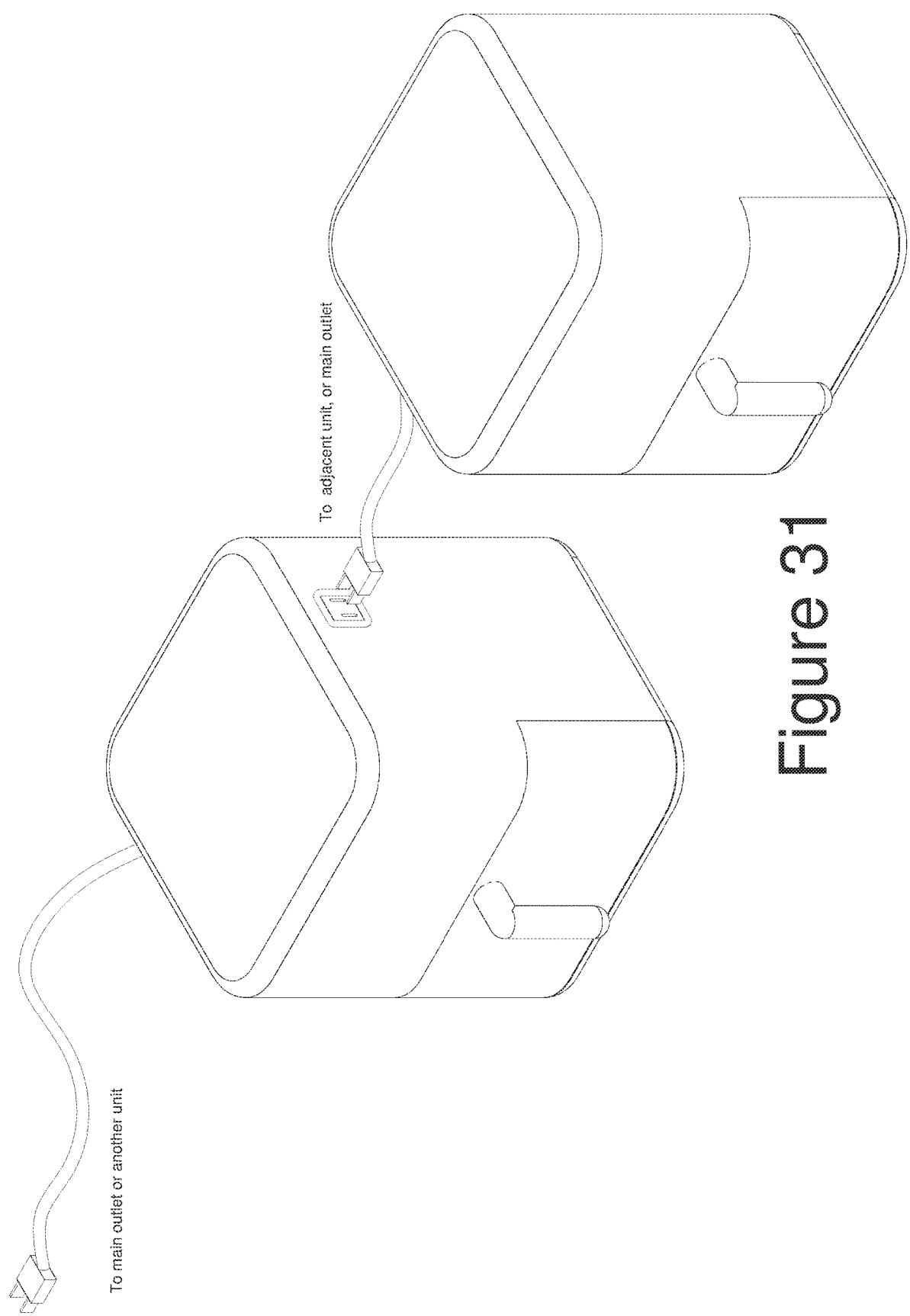

FIG. 31 depicts units that may be ganged together. These units may be ganged physically, stacked, side by side, etc. or electrically. One such advantageous way is to have them daisy chained, I.e. one plugged into another and then one plugged into the mains/wall outlet. There are advanced controls with the knowledge they are daisy chained. I.e. when the units sense a daisy chaining, the control acts differently. When multiple units or discrete chambers/vessels are used concurrently, timing and associated heating cycles (disclosed be) may be accounted for to create even heating between units/vessels based upon number of vessels used at any instantaneous point and desired temp/finish time to create concurrent heating cooking so that all chambers and foodstuffs can be ready concurrently or sequentially depending on the cook or chefs choice.

Additionally, multiple units may be plugged into another with a proprietary plug, and only one unit being configured to plug into a standard mains outlet with a standard plug, giving the manufacturer control over the number of units that may be ganged together.

And so the units may dynamically change depending upon the required load, i.e. number of units and time/temp to achieve desired results all while also satisfying the power threshold of a domestic home (typically 1800 watts) or a commercial kitchen (variable ultimate power available). The cycling protocols, such as partial power, and/or timed cycling strategies between units and structures for accomplishing this is covered in other parts of this disclosure(s).

A fundamental problem is that there is a current threshold that appliances need to be under to not overload an electrical system. In the United States, and domestically/in homes, this is typically regarded as 1800 watts. So an immediate challenge is running units of a larger size, or multiple units while stayning under this or other thresholds. Embodiments of this application and invention address this issue.

Tests Run to Determine Viability and Efficacy of Multiple Units Run Concurrently Cyclical powering one or more components of a zone or units relative to another(s) such as heating elelments/fans and/or Cyclical powering of zones or units via multiple methods/modes was tested. Various parameters were to be established wuch as whether the latent heat generated during power on duty-cycle carries cooking forward during a given zone/or unit being powered off, either in totality or in part such as the fan continuing to run while the heating element is off as the fan is a fraction of the power requirements of a heating element etc.

Baselines of Units 2 units were tested simultaneously.

Both units were "standard" top-down configuration of a drawered countertop air-fryer in 100% duty cycle scenario.

One unit was powered for 50 percent of the time. (time/duty cycling) A second unit was powered 100 percent of the time but at 50 percent current. (power cycling)

Thus, the results may lead to: Reducing the constant power (via time/duty cycling and/or power cycling) of both the heating element and fan to a total of 800-900 watts so that 2 complete independent zones/units may be powered concurrently and be under the 1800 watt accepted U.S. household threshold. Or 2) Reducing the constant power (via time/duty cycling and/or power cycling) of both the heating element and fan to a total of 600 watts so that 3 complete independent zones/units may be powered concurrently. Or 3) Reducing the constant power (via time/duty cycling and/or power cycling) of both the heating element and fan to a total of 400 watts so that 4 complete independent zones/units may be powered concurrently and coming in under the 1800 watt threshold.

Additionally, these structural modes and methods enable larger units to function/operate than was previously possible.

First the top heat values attainable by the test units were established to verify the 2 units performed similarly to each other in unaltered states and to establish their capabilities in unaltered states.

As unaltered units= the to be "power throttled" unit run unthrottled (i.e. full power) can achieve a top heat of (thermostatic swing/variance) 396-431 the to be "time-duty cycled" unit run fully on (duty cycle=100%) can achieve a top heat of (thermostatic swing/variance) 378-425.7

As altered units= the power throttled unit run with the element 50% throttled/full fan can achieve a top heat of (no thermostatic swing) of 334 the time duty cycle unit run 50% on time/1 min cycles can achieve a top heat of (no thermostatic swing) 392.7

Conclusion: Cycling the Time the Element is on in Unit(s) is More Efficient for Reaching Ultimate High Temperatures than Throttling the Power of a Unit(s)

"Race and ultimate temp between ½ power versus ½ duty/timed cycle"

| TIME/MINS | TEMP HALF POWER | TEMP HALF CYCLE | First cycle = not on |
|---|---|---|---|
| 0 | 74.1 | | |
| 1 | 135 | 71.4 | ON |
| | | | TEMP TAKEN |
| 2 | 178 | 131 | OFF |
| | | | TEMP TAKEN |
| 3 | 213 | 126 | ON |
| | | | TEMP TAKEN |
| 4 | 235 | 210 | OFF |
| | | | TEMP TAKEN |
| 5 | 252 | 205 | ON |
| | | | TEMP TAKEN |
| 6 | 262 | 276 | OFF |
| | | | TEMP TAKEN |
| 7 | 272 | 262 | ON |
| | | | TEMP TAKEN |
| 8 | 286 | 312 | OFF |
| | | | TEMP TAKEN |
| 9 | 295 | 297 | ON |
| | | | TEMP TAKEN |
| 10 | 301 | 306 | OFF |
| | | | TEMP TAKEN |
| 11 | 306 | 286 | ON |
| | | | TEMP TAKEN |
| 12 | 312 | 308 | OFF |
| | | | TEMP TAKEN |
| 13 | 309 | 304 | ON |
| | | | TEMP TAKEN |
| 14 | 305 | 285 | OFF |
| | | | TEMP TAKEN |
| 15 | 300 | 324 | ON |
| | | | TEMP TAKEN |
| 16 | 299 | 314 | OFF |
| | | | TEMP TAKEN |
| 17 | 300 | 309 | ON |
| | | | TEMP TAKEN |
| 18 | 300 | 291 | OFF |
| | | | TEMP TAKEN |
| 19 | 299 | 328 | ON |
| | | | TEMP TAKEN |
| | | | OFF |

DEFINITIONS:
HALF POWER MEANS THAT THE HEATING ELEMENT IS RUN at ~50% of its normal full current draw. In this case full draw is 922, and the element was run at 461 watts. The fan was run at 100%, (it draws 36 watts) and 100% of the time.
Half cycle means that the element and/or the fan is run for a given time duty cycle and then is turned off for a given time duty cycle. In the following test the duty cycle was 1 min on, one min off for the element and the fan.

Conclusion: Cycling the Power to an Element is More Efficient for "Speed to Temperature" (to a Point) than Throttling the Duty Cycle/Time on of a Unit(s)

Conclusions and Resultant Structural Approach to Running Larger Volume, Separate Units:

By comparing the data from "Race between ½ power versus ½ duty/timed cycle" and "Side by side ½ power ½ cycle ultimate potentials" use of a programming algorithm/fuzzy logic etc. or circuit timing that uses a half, (in the case of two concurrent unit-zone, or fractional of the total in the case of plurality unit-zones.) power/current scheme (but on 100% of the time) to bring the chamber up to a temperature, as this is fastest, and then the program switches to a 50% time based duty cycle (100% power) in order to achieve the higher temperatures when necessary. Thus, this is one preferred embodiment.

I.e. When a unit or chamber/vessel needs to be run at less than 100% power because there is more than one chamber/vessel on the same circuit that has a power limit/ceiling, structuring a lower power scheme is advantageous to bring things up to temp faster, but then at a "given point" a time cycling scheme can be structured to achieve higher temps. This "given point" may be established by an embodiment employing an algorithm that monitors the time to temp rise rates and makes adjustments accordingly as this can vary based upon what and how much is being cooked.

And so, the system may structurally detect if throttling or reduced powering is necessary based on whether more than one unit is in concurrent use and cyclically adjusted, Interleaved duty cycles among multiple units may be employed. Additionally this interleaved, cyclical approach may be utilized with other heating/cooking electrical loads disclosed such as induction combined with oven heating/air frying to stay within/under a given instantaneous power threshold.

Figure 32:
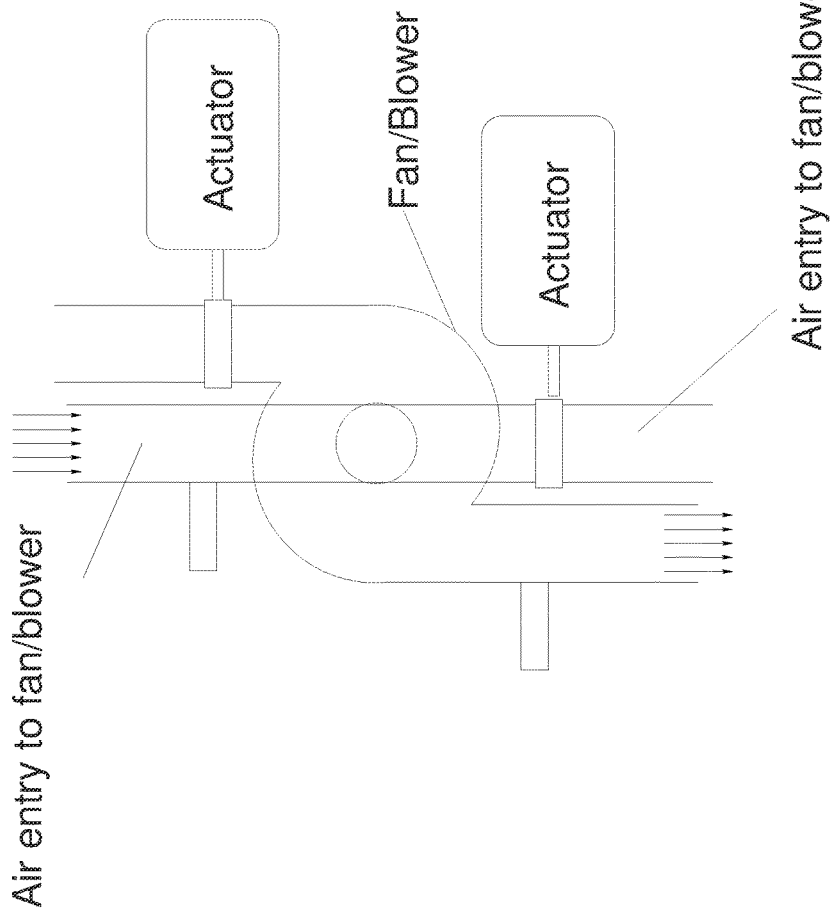

Now referring to FIG. 32, an arrangement can be seen for reversing airflow in a scenario similar to that that may be found in embodiment such as FIG. 30. By utilizing one or more actuators, airflow may be effectively reversed. In this case, airflow direction could be reversed from the top of the vessel to the bottom, then from the bottom of the vessel flowing to the top and back to the central fan. Or in the case of the oven of FIG. 10, side to side.

Referring to FIGS. 33A and 33-B, a similar arrangement to that FIG. 32 can be seen, in this case the layout has greater horizontal aspects and can be seen how a single actuator may be used to achieve this changeover of airflow direction.

Referring to FIG. 34 A-C, various views of alternative embodiments may be seen. These embodiments relate to structures similar to that seen in FIG. 30 whereby there is a top port, and a bottom port. The primary difference between FIG. 30 and FIGS. 34 A-C, is that in figures the top port is shown to be structurally part of the lid. This has numerous alternative advantages, though the structure of FIG. 30 is a valid functional structure as well. Also depicted in FIGS. 34 A-C, is that vessels of various shapes and heights are considered and anticipated and will be structurally accommodated and described in the following figures and embodiments. Also depicted is that lower port 76, may be structurally configured to be above the base by a given amount to allow the use of liquids yet prevent those same liquids from entering the airflow conduit. Also depicted is food support 52 may be an "induction at a distance" emitter from an inductive source depicted by base unit 68, which could also include a halogen heat source or resistive heat source as well as others.

Figure 35:
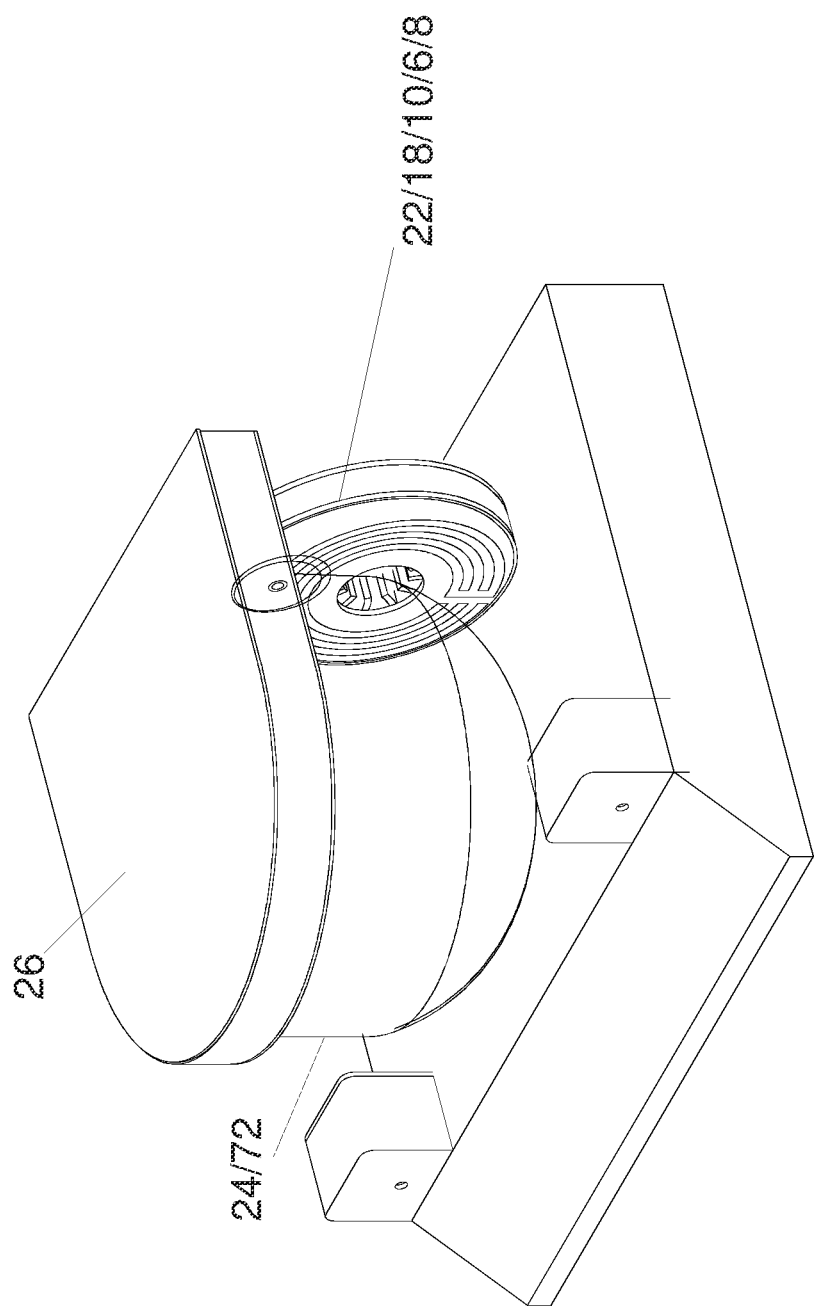

Referring to FIG. 35 and embodiment that shares some similarities to that of FIGS. 34 A-C can be seen. Removable cooking vessel 24/72 can be seen. It's lid 26 can also be seen. However what differentiates this embodiment from that of FIG. 35 is that not only one duct is disposed within lid 26, but both ducts of the closed loop. In other words, there structurally is not a breach in cooking/serving vessel 24/72. In the case of FIGS. 35, this breech, 76, occurred lower in the cooking vessels structure. This and other features will be described in the figures to follow.

Figure 36:
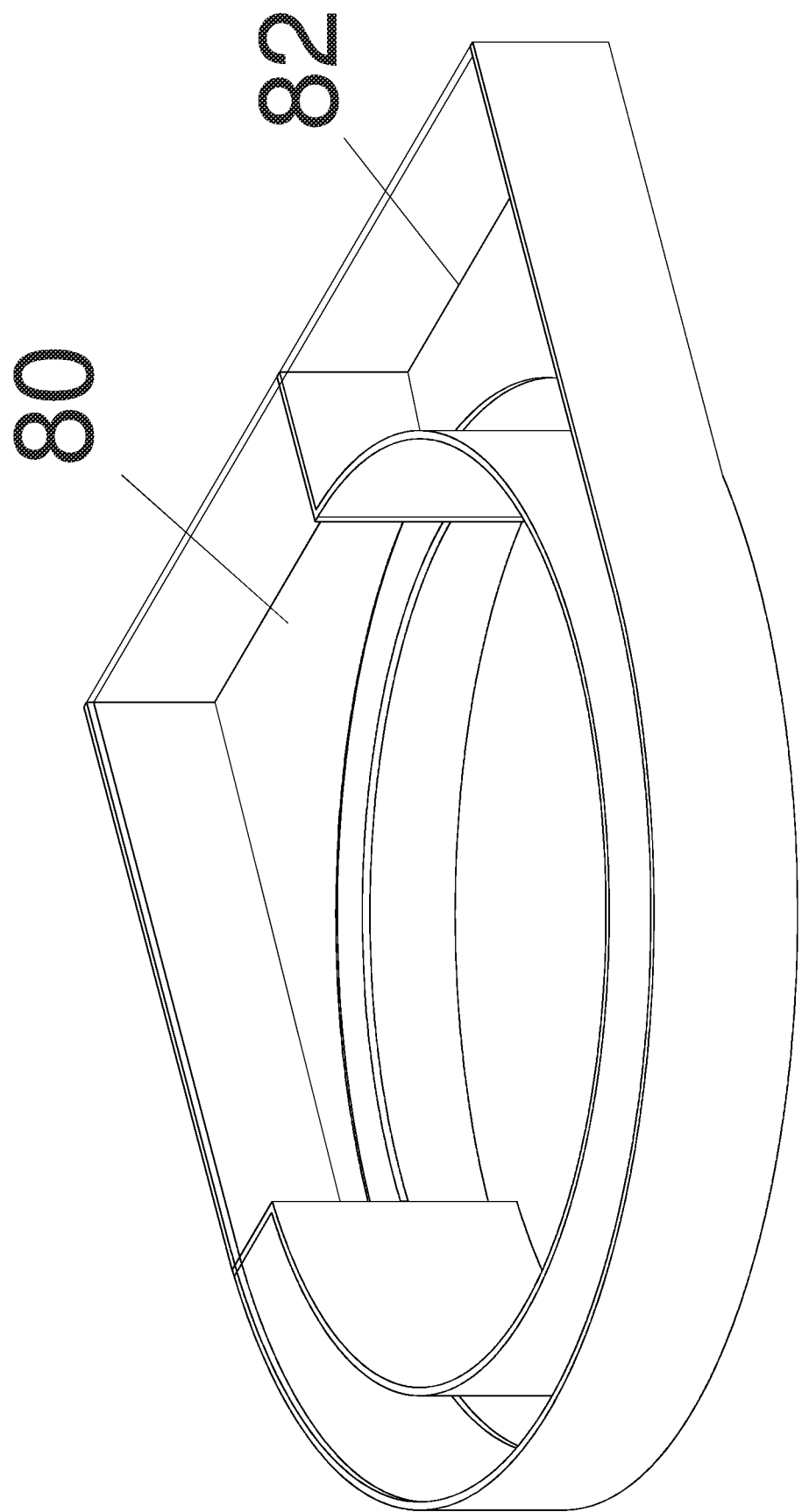

FIG. 36, is a view of the lid with a transparent top face/wall, 26, of FIG. 35. This lid is in fluid communication with the main ducting of the unit which selectively includes the fan heater(s), and optionally reversing structures ducting/actuators. This lid thus docks/interconnects with the other ducting. It is divided generally into 2 discrete airflow passages, which intercommunicate with lower bowl/cooking vessel 24/72 and the main airflow impeller(s)/fan 22, heater (s) and associated ducting. 82-First air path in or out of lid can be seen as well as, 84-Second air path in or out of lid. Thus it can be seen that this provides, a guided air path into an out of an associated cooking vessel disposed below.

Figure 37:
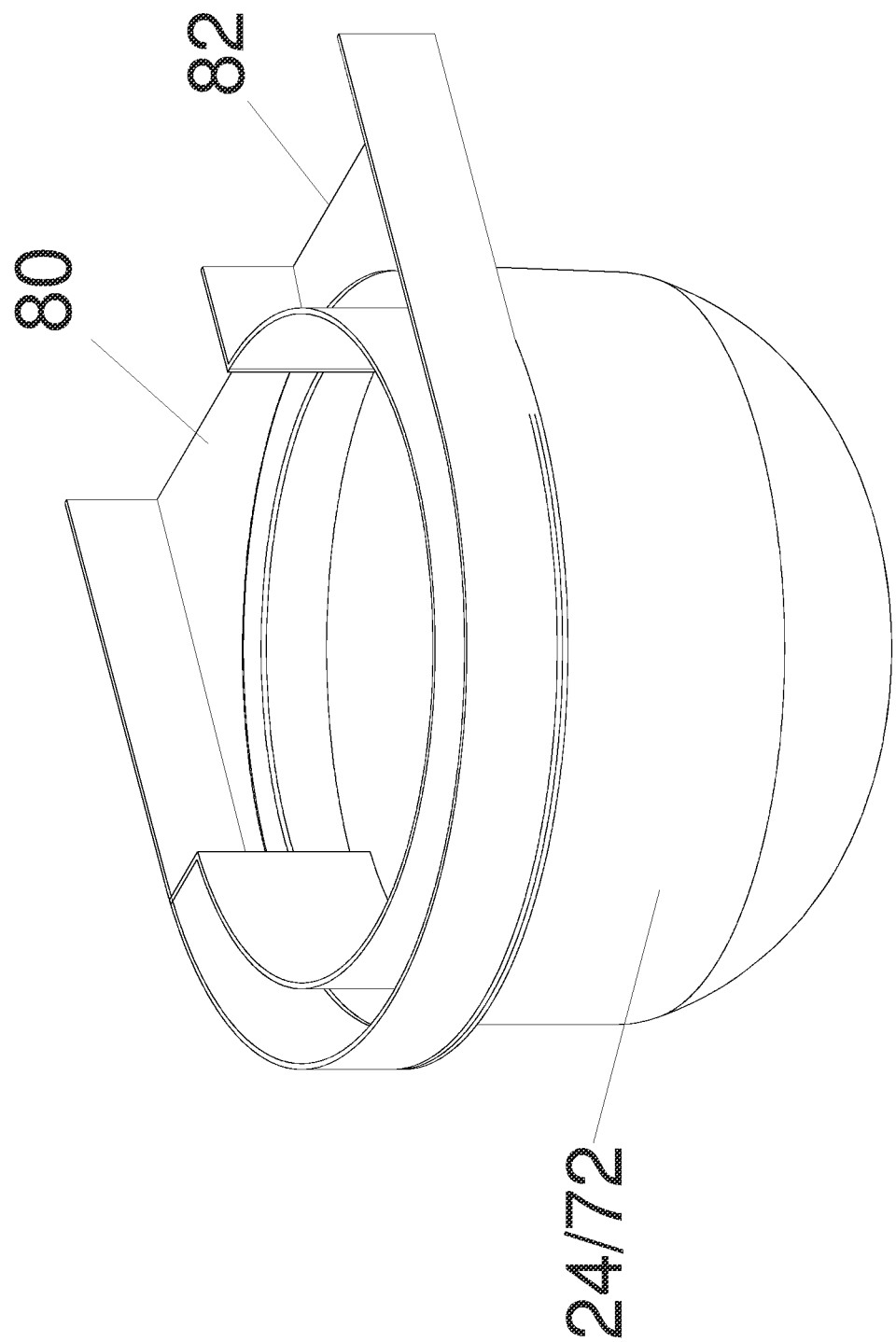

FIG. 37, is much like that of FIG. 36 however the top wall of the lid has been removed, and a cooking vessel 24/72 has been included for clarity. Of note is that cooking vessel 24/72 may be of the singlewall construction or of a double wall construction as was described in FIGS. 1, 7 and 8 for example to further facilitate guided airflow through the food and cooking chamber. But one structural enablement of this embodiment, as well as many of the other embodiments are to enable the fan and/or the heater to be mounted at a location that is not directly above the vessel which has fundamental positive implications ranging from efficiency, to ergonomics to assembly to costing.

Figure 38:
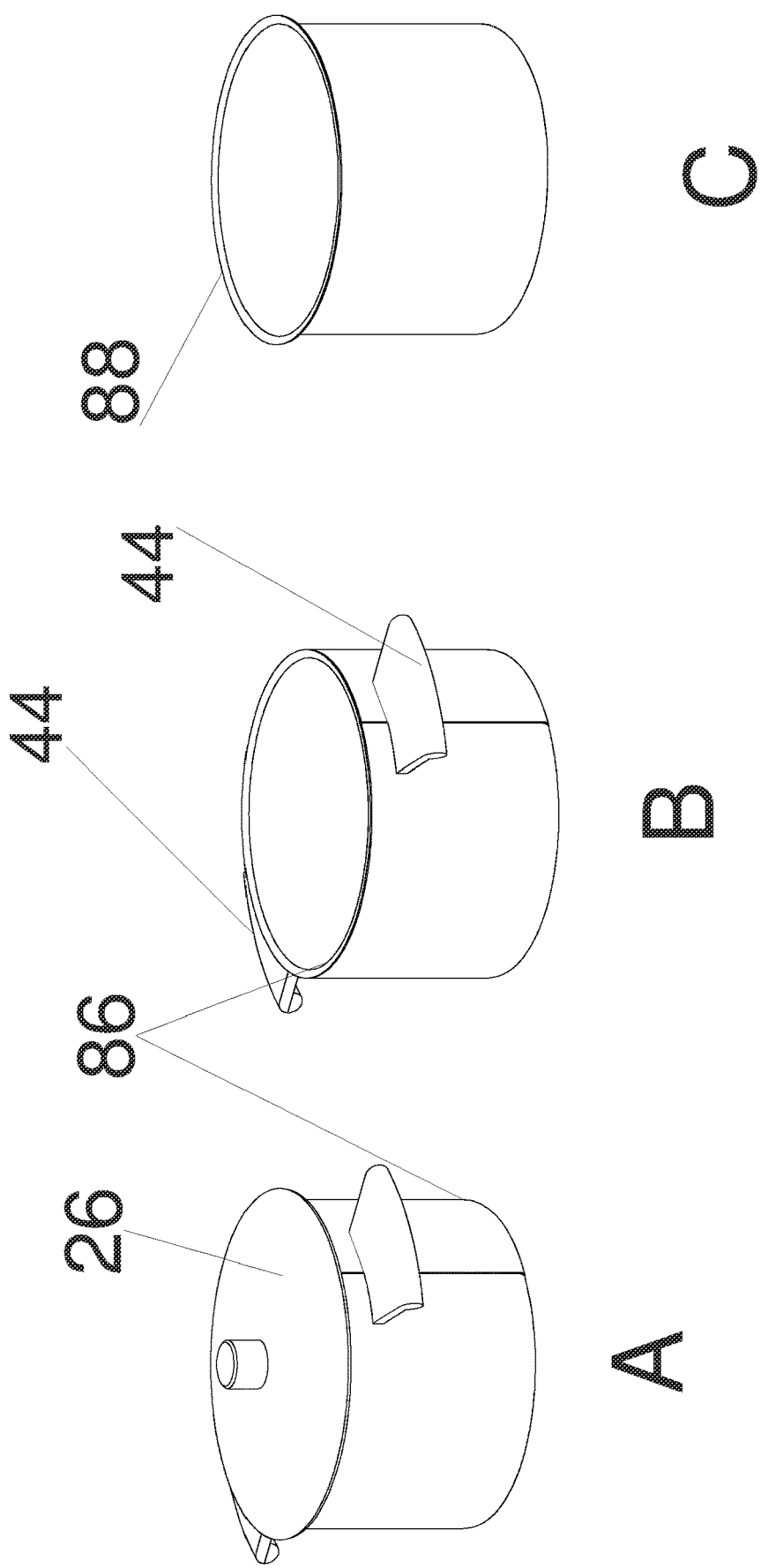

FIGS. 38, views A, B and C. depict a lower bowl/cooking vessel and maybe used with a plurality of the disclosed embodiments. A shows a full assembly, with a lid. This lid, may be as just been described in FIG. 37, or just a simple lid or keeping the contents hot and 4 for serving. This assembly may be made as a single unit of a unitary material such as metal, plastic, glass, clay etc. or as an assembly as will be now described. Figure B, shows just the external "carrier pot", and figures C, depicts the inner cooking pot. The structure of B in preferred embodiments is constructed of a material with a low heat coefficient. Whereas structure of C in a preferred embodiment is constructed of a material with a relatively high heat coefficient. Furthermore, an airspace may be structurally provided between these 2 nesting bowls, to further insulate. (In alternative preferred embodiments, this airspace can serve as a part of the duct work in guided airflow within the cooking vessel embodiments as has been described and was described with regard to the alternative structures of FIGS. 1, 7 and 8.) Thus, foodstuffs may be heated and/or cooked in "C" and yet the exterior of "B" remains relatively cool for user handling, and serving at another location such as a table etc. An alternate anticipated and disclosed construct is that the handles and/or base are is made of a wire form/basket that the liner/inner 88 sits within.

FIGS. 39 through 49 depict a unique structural configuration is structurally enabled by cantilevering a hood area above the cooking vessel/bowl(s), so that the vessel/bowls may be accessed from their front, or their sides in a new and novel fashion.

This unique cantilevered structure is applicable to any and all other embodiments within this disclosure.

One way in which this cantilever is achieved is through pillars or posts. This creates a less massive design which is more economical to produce, and aesthetically more pleasing. Furthermore in some embodiments it makes it structurally possible for the top heating/cooking assembly hood to be vertically translatable, so that differing sized cooking vessels may be used within the same unit.

Figure 46:
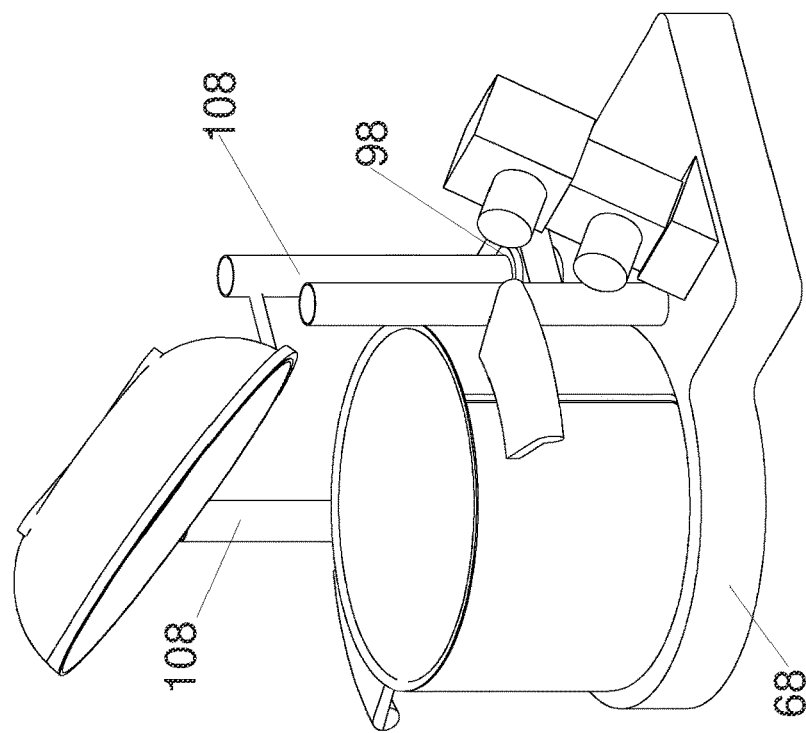
Figure 46:
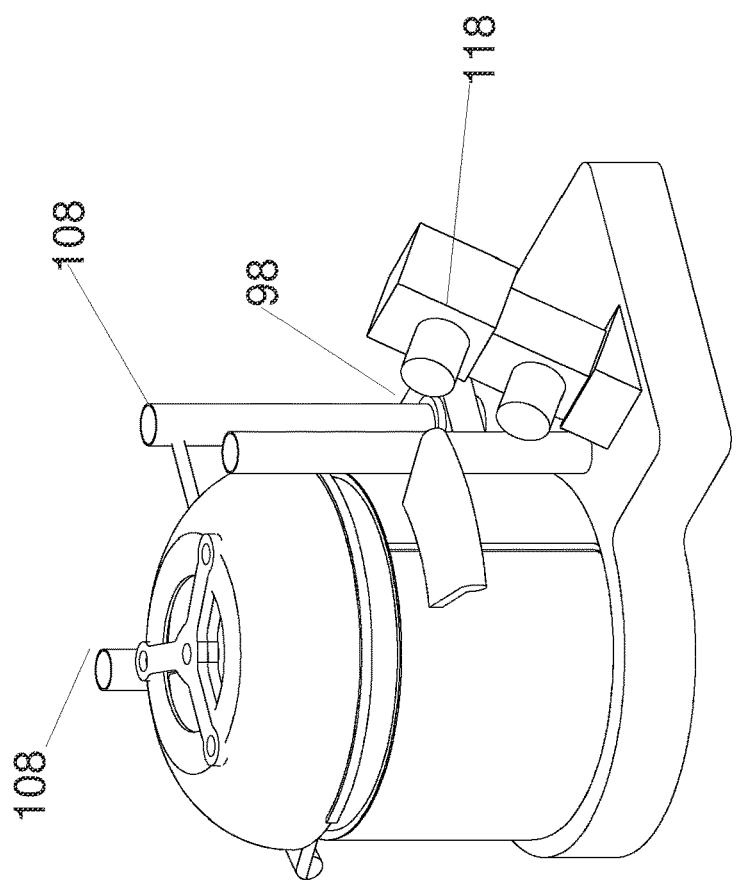

An alternative, and additive embodiment, whether the cooking lid/hood is vertically translatable or not, the cooking lid/hood may be affixed via a pivot/hinge to the cantilevering structure, making it so that the hood/lid may be flipped open to access/load cooking vessels, as can be seen in FIG. 46.

Figure 49:
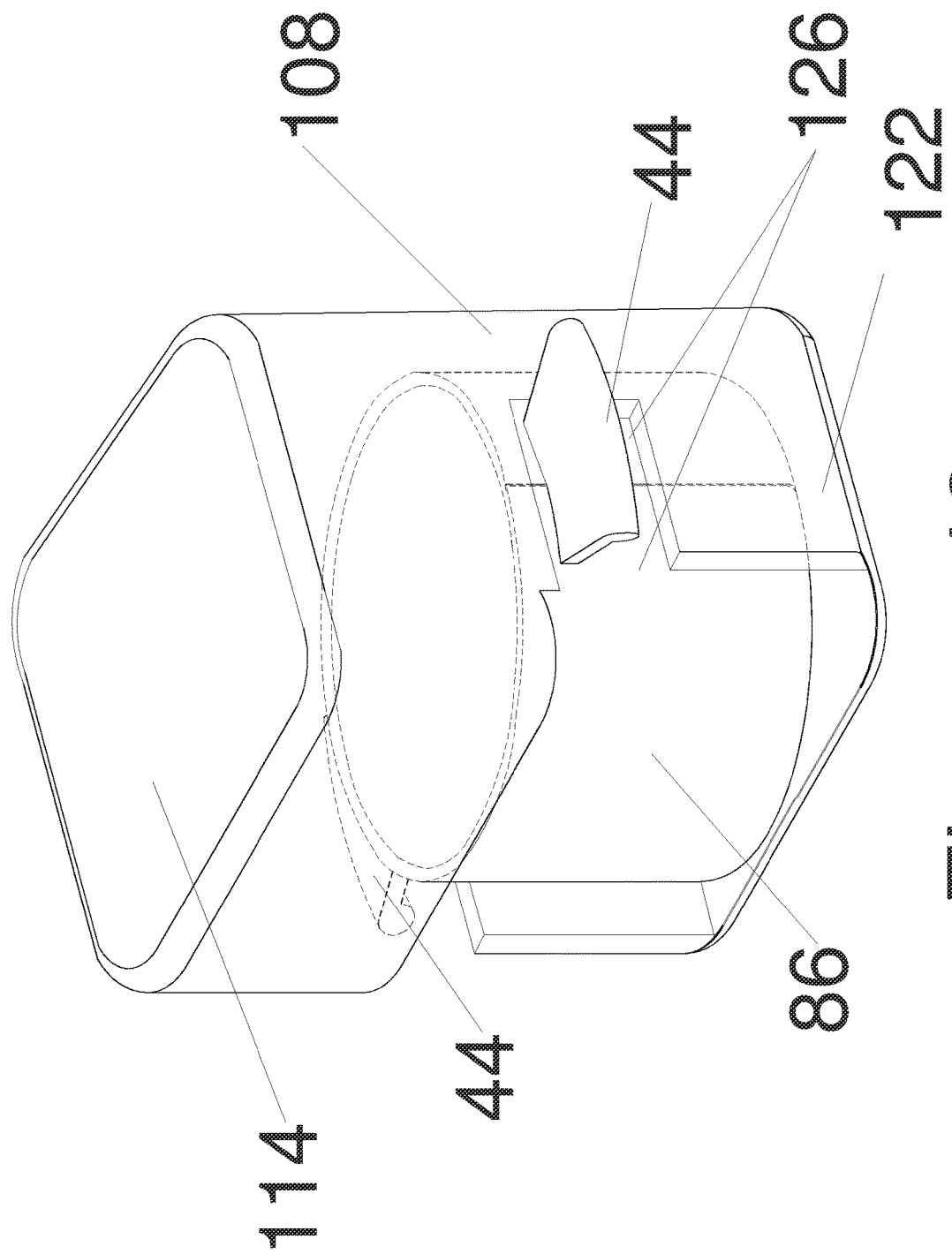

FIG. 49 depicts another cantilevered structure allowing access to the handles 44, for newly enabled functionality for the user. It can be seen that the base of the unit is connected to the hood via vertical support area 108 putting the hood in a cantilevered orientation to the base unit 122. It can also be seen that cantilever is further structurally enabled by Cut out/portion 126. For clarity the cooking vessel is both in solid line and hidden line to show its relationship to the main unit/base/vertical support and hood unit. It can also be seen that the handles are generally outside of the upper area/hoods envelope. In this way, the hood can fully cover the cooking vessel 86, while allowing and enabling access to the handles 44. While the unit could still be cantilevered and overlie the handles and still be within the spirit and scope of the invention, having the two handles protrude is a preferred embodiment as it functionally gives a user a clear line of sight to the handles and increased utility.

FIGS. 39 through 49 also depict structural embodiments that contemplate the mechanicals with various inclusions being located in various areas. And so also shown in FIG. 39, cooking device has its associated fan and the heater being disposed generally above the cooking however the motor for driving the fan has been moved to the rear of the unit to improve the airflow/cooling of the motor and dramatically reduce the vertical spatial size of the unit.

This will be further described with other figures as well as other embodiments that disclose novel structures for moving one or more of the functional elements to an area distal to that generally above the cooking vessel to achieve similar structural and performance improvements.

Figure 39:
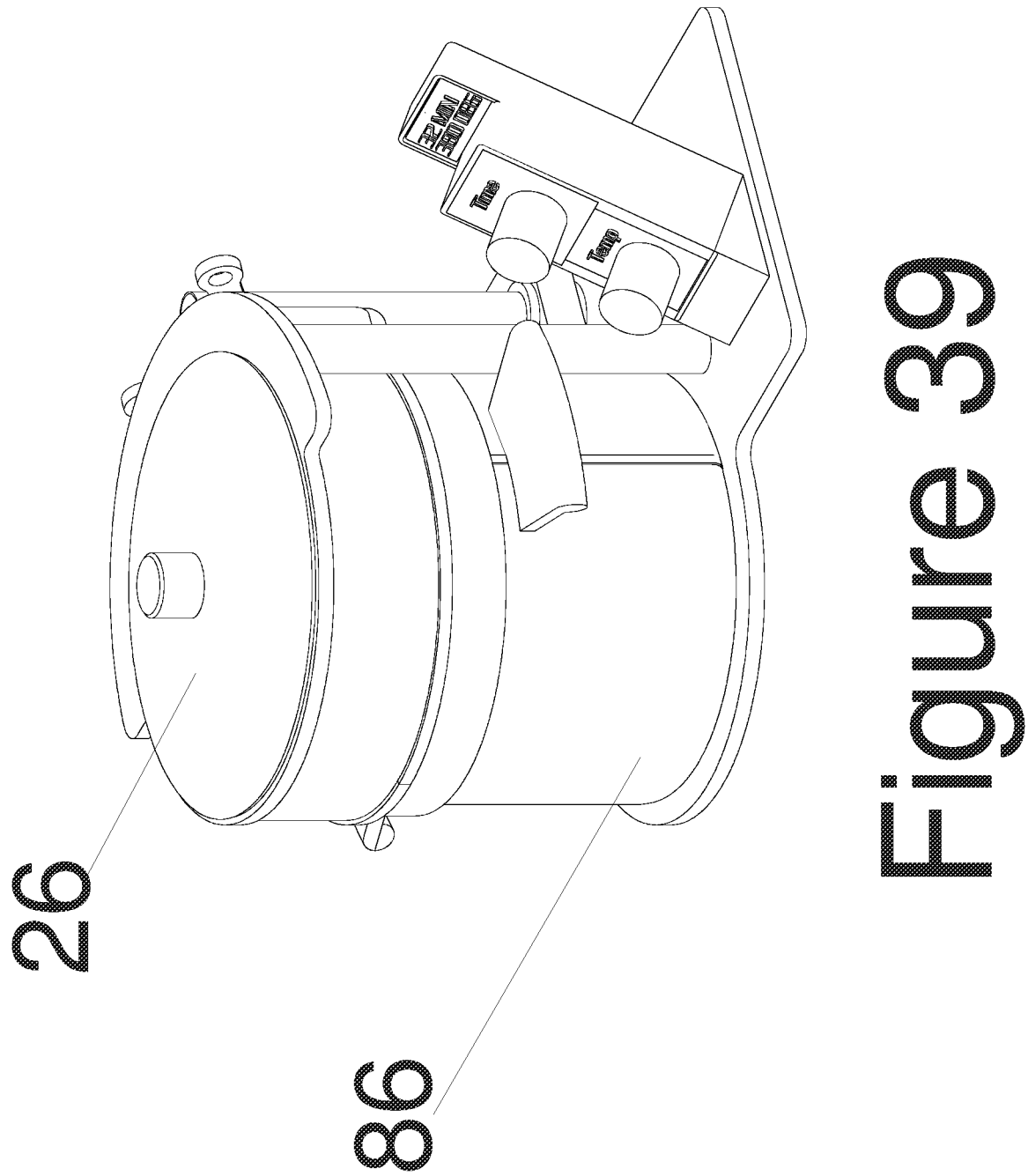

FIG. 39 also shows that the lid 26, of FIG. 38 may be conveniently stored on top of the unit.

This pillared, cantilevered structure and architecture may also be combined with other disclosed embodiments such as air-flow lid of figures (embodiments) 35-37 and also lead to the following structural outcomes:
1) Reduction of top mass which lead to unique unprecedented low profile with functional, structural and aesthetic results.
   A) motor on back with bevel gear/belt/chain and associated drive shafts etc.
   B) motor on bottom belt/chain and associated drive shafts etc.
   C) remoting of controls
2) ways to dock the vessel in a generally air tight/low escape way
   a) ramp with optional registration
   b) Teeter totter ramp
   c) flipable hood style
   d) vertically adjustable hood/upper unit-enabling different height bowls/containers
   e) raisable turntable
   f) cam raise
   g) spring loaded base/underplate
3) Bowles, both inner and outer, Nylon, silicone, clay, porcelain, glass, phenolic or other high temp inner and or outer bowl to make it safe for handling, affixed to or removable (push-hole embodiment) that also may function as a built-in/integrated trivet for protecting tables/countertops. safety switch to ensure that the inner pot is in use, activated
4) cantilevered design of upper hood unit to enable plurality of handle styles and locations.
5) Handles on the sides enabling greater ergonomics and new aesthetics to the category.
6) Lid support/storage on top of unit.

And these disclosed embodiments are a complete departure from the structural architecture of record yielding a completely new performance, new aesthetic and functionality for the consumer/user.

Now referring to FIG. 40, Several structural embodiments of remotely communicating cooking status will be described. Sample information that may be communicated include but is not limited to a status indicator of set time and set temperature, actual time left and actual temperature, etc. Several structural embodiments are thus described.

One embodiment of remotely communicating this data uses a cellular or Wifi, or Internet connection to communicate to a users cell phone.

Another embodiment, users a self-contained wireless protocol such as Zigbee, Bluetooth, or proprietary use of radio channel to communicate to a users cell phone.

And yet another embodiment uses infrared communication.

And so the above embodiments, contemplate the use of a users cell phone, tablet computer communicate with.

Alternate embodiments, contemplate and disclose an "Information-Beacon" being a separate unit provided with the base cooking unit. The Beacon may or may not be in dockable/removable relationship with the base cooking unit.

Figure 40:
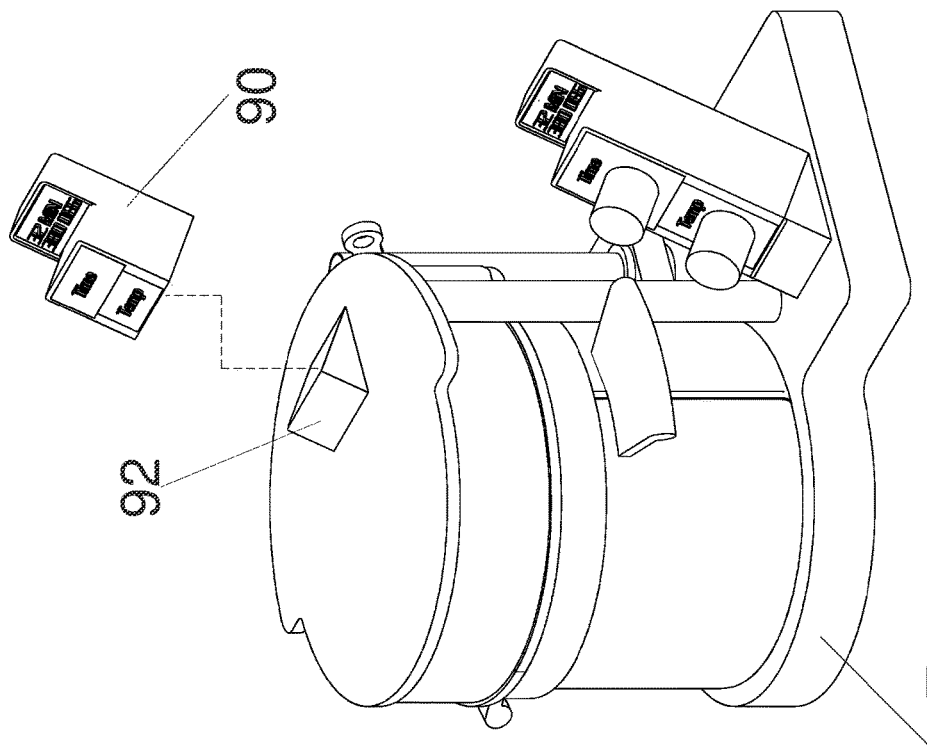

And so, also referring to FIG. 40, a unique remote "Beacon", 90 can be seen. 90—Remote "Beacon" is a status indicator of time and temperature, actual time left and temperature, etc.

Beacon 90 may dock at docking station/port 92, storage, and for recharging, firmware updates, data exchange or other "wired" or "unwired" function. Additionally, multiple beacons (and/or docking areas) may be provided for a single appliance so that multiple users may be able to use them simultaneously, or to account for when one Beacon is "misplaced". Magnetic and electrical docking via alternate or same contacts/magnets.

As before, embodiments of the "Status-Beacon" may use cellular or Wifi, or Internet connection or Zigbee, Bluetooth, or proprietary use of radio channel to communicate or infrared communication or other communication protocol to connect to the base cooking unit. Additionally, a second, third, etc. signal may be also transmitted from the base cooking unit to a users cell phone, television, tablet, computer etc.

In all of the above communication embodiments, in addition to obtaining status, the user may also, remotely input or change cooking intent, i.e. time/temp, holding temperatures venting and/or steam release etc. Additionally to being able to activate presets, activate venting/steam release as well as other functions.

Again Referring to FIG. 40; in yet another embodiment, there is no wireless, communication between the base unit at the Information Beacon. Instead, in another novel structural arrangement, the Beacon is in disconnectably-wired communication with the base unit at for example docking 92, as the base unit commences its cook Time. At which time, 2 separate timers, one on the base unit, and another on the Beacon are synchronized. Thereafter, if the user takes the beacon, disengaging it from wired communication, its internal timer is synced/synchronized with that of the base unit and the beacon is able to give real time feedback of time remaining and then provide an alarm visual and/or audible and or tactile/vibratory to alert the user that the cooking cycle has completed. And in pressure cooker applications there can be "steam-release" and "vent reminder" notification capability on the remote beacon. This synced timer structure and method, uniquely solves many problems and does so in a way that is not limited by cost, bulk added to either unit, or pairing and transmission issues of distance limitations, interference etc. that wireless communication presents. As well as reduced cost and the units may be made smaller as their electronic requirements as well as battery power/smaller batteries.

In all of the above communication embodiments, in addition to obtaining status, the user may also, remotely input or change cooking intent, i.e. time/temp, holding temperatures venting etc.

Additionally, any of the aforementioned beacons may be placed in front of a stationary master display, thus acting/mirroring as the main input display, or adjacent or behind the display that is to stay with or is part of the main device. Additionally, the beacon may be the only display, and removable/remote to the main unit.

Additionally any of these beacons may be used with a wide variety of appliances, from air fryers to ovens/toaster ovens to slow cookers to pressure cookers to grills etc. and a plurality may be used with a single appliance.

All of these embodiments may be combined, recombined without limitation.

Figure 41:
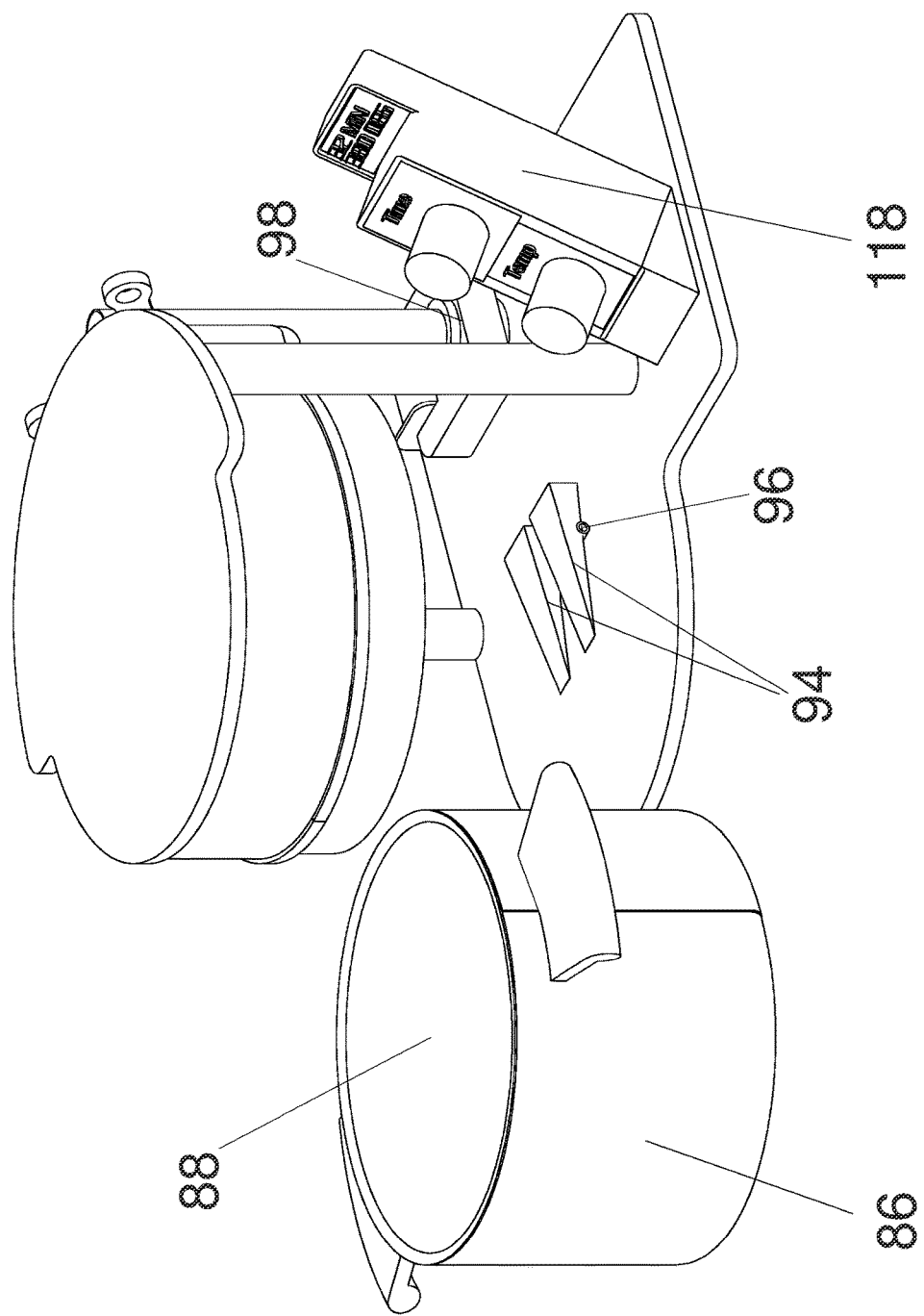

Referring to FIG. 41, inner and bowls 88 and 86 can be seen partially removed from the unit. Inclined plane(s) 94 can be seen that guide the bowls and seat them vertically into more substantial air-flow contact with upper cooking unit. These inclined planes may be of a generally rigid material, or of an elastomeric material such as foam, rubber, or spring-loaded rigid material in order to selectively elevate food holding vessels/bowls 88/86.

In an alternative embodiment, wedges/inclined planes 94, include a pivot 96 thus pivoting to alternate their support as the bowls are inserted. 98-Motor to drive a fan(s) can also be seen in a lowered position to achieve new performance and aesthetic goals.

Figure 42:
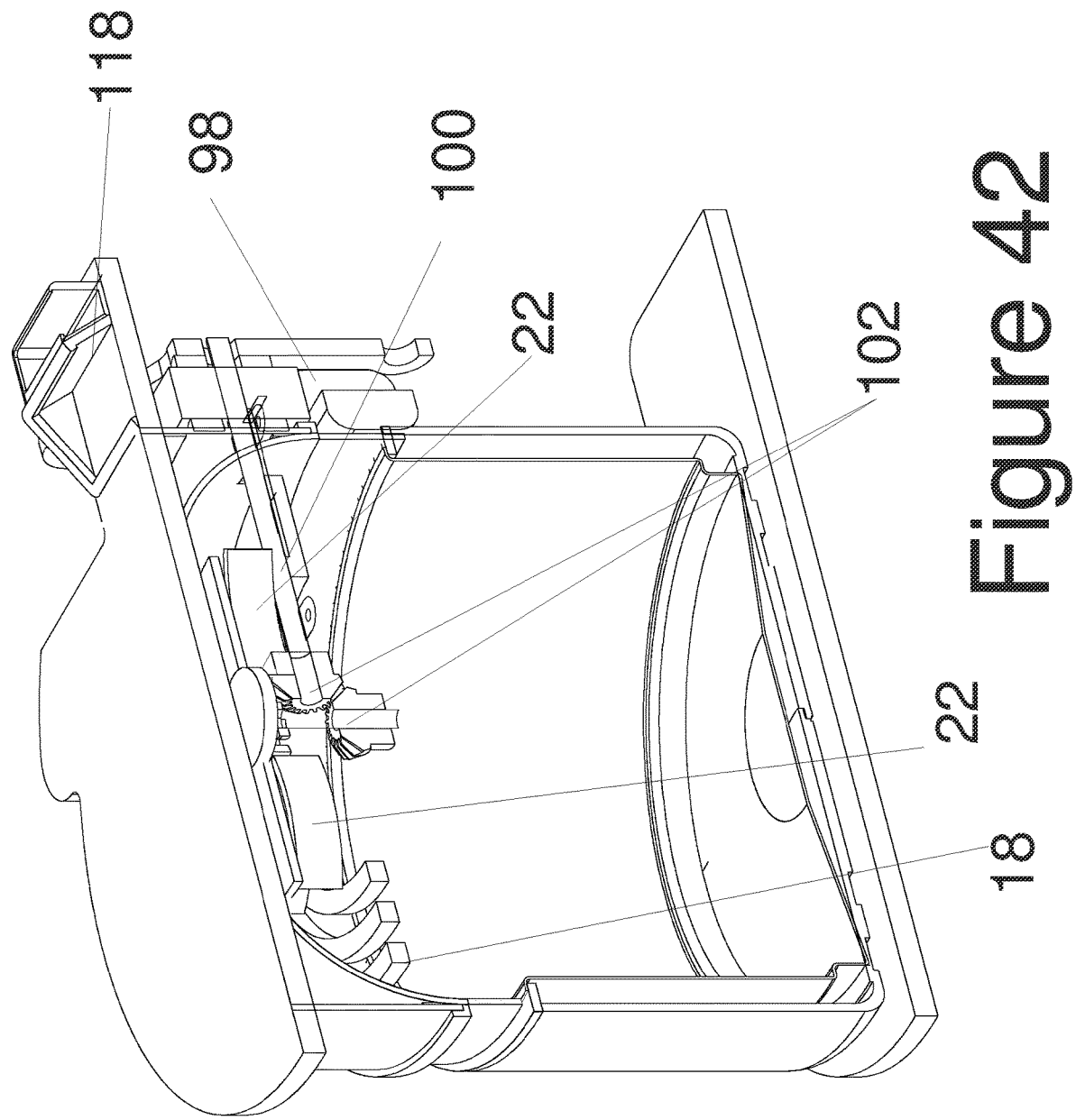

Referring now to FIG. 42, a section view of an assembly similar to that of 41 can be seen. However, in this embodiment motor drive to fan, 98, is disposed directly behind the upper portion of the hood. In this way, the motor is removed from the vertical heat of the lid area, and furthermore a lower profile is achievable. In this way, a fan to cool the motor may be obviated, or greatly reduced in size/structure as traditional top-down configurations, with the motor and heater on top, necessitates cooling the motor with a separate fan and space-consuming separate air flow channels to the motor as heat rises. Additionally, the traditional air flow usually (if not always) flows through the walls near the cooking chamber reducing cooking efficacy in order to cool the top-mounted motor from damage.

This new arrangement is structurally achievable by way of shafting 100 and Bevel gearing 102. As will be seen in alternate embodiments, pulleys, belts/chains and the like are also anticipated means of transferring motive force from the remotely mounted motor to the site of the fan(s).

Figure 43:
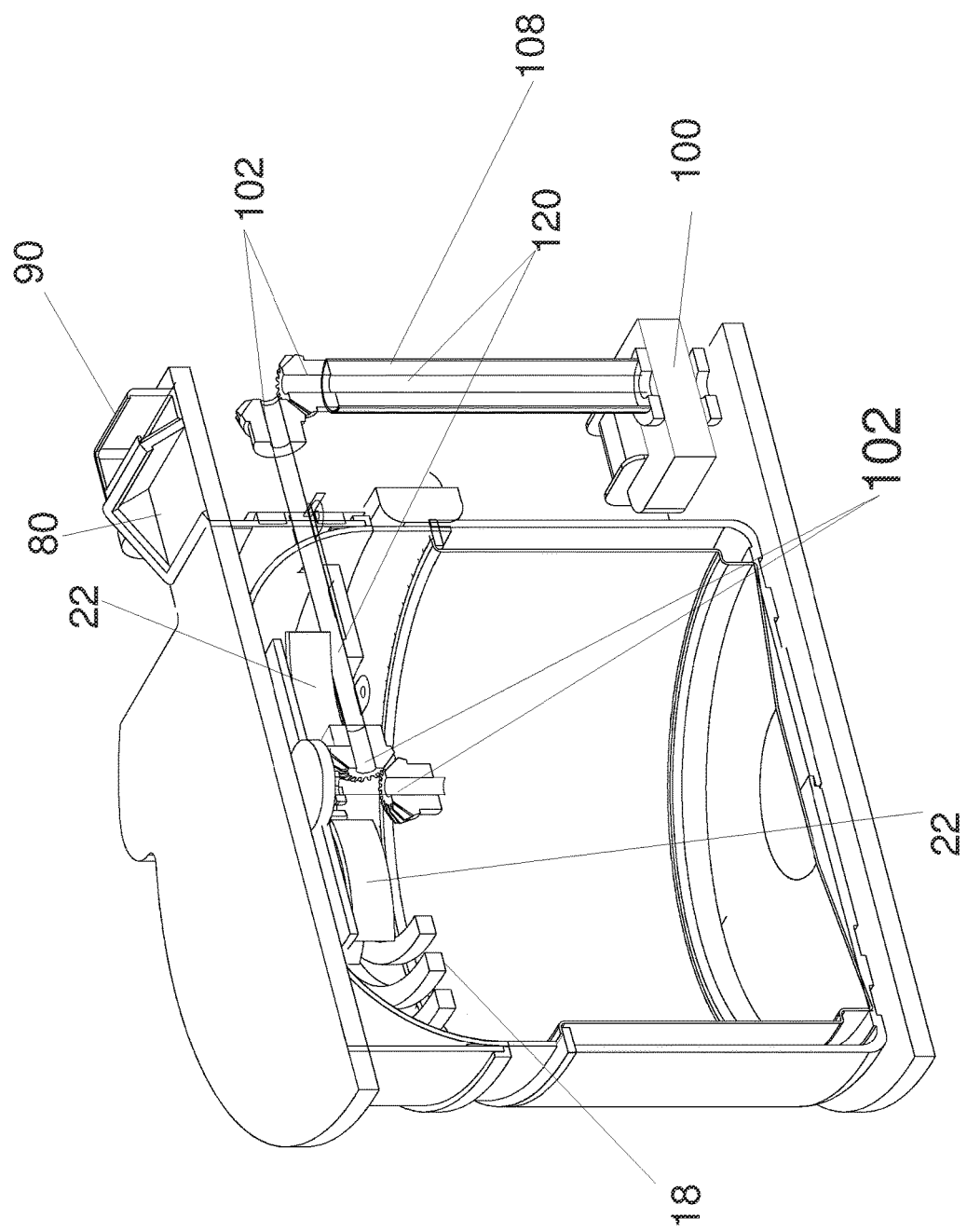

Referring now to FIG. 43, a section view of an assembly similar to that of 41 and 42 can be seen. However, in this embodiment motor drive to fan, 98, is disposed directly behind and then below the upper portion of the hood. In this way, the motor is also removed from the vertical heat of the lid area, and furthermore a lower profile is achievable. In this way, a fan to cool the motor may be obviated, or greatly reduced in size/structure and the motor may be mounted at/on the base of the unit.

Figure 44:
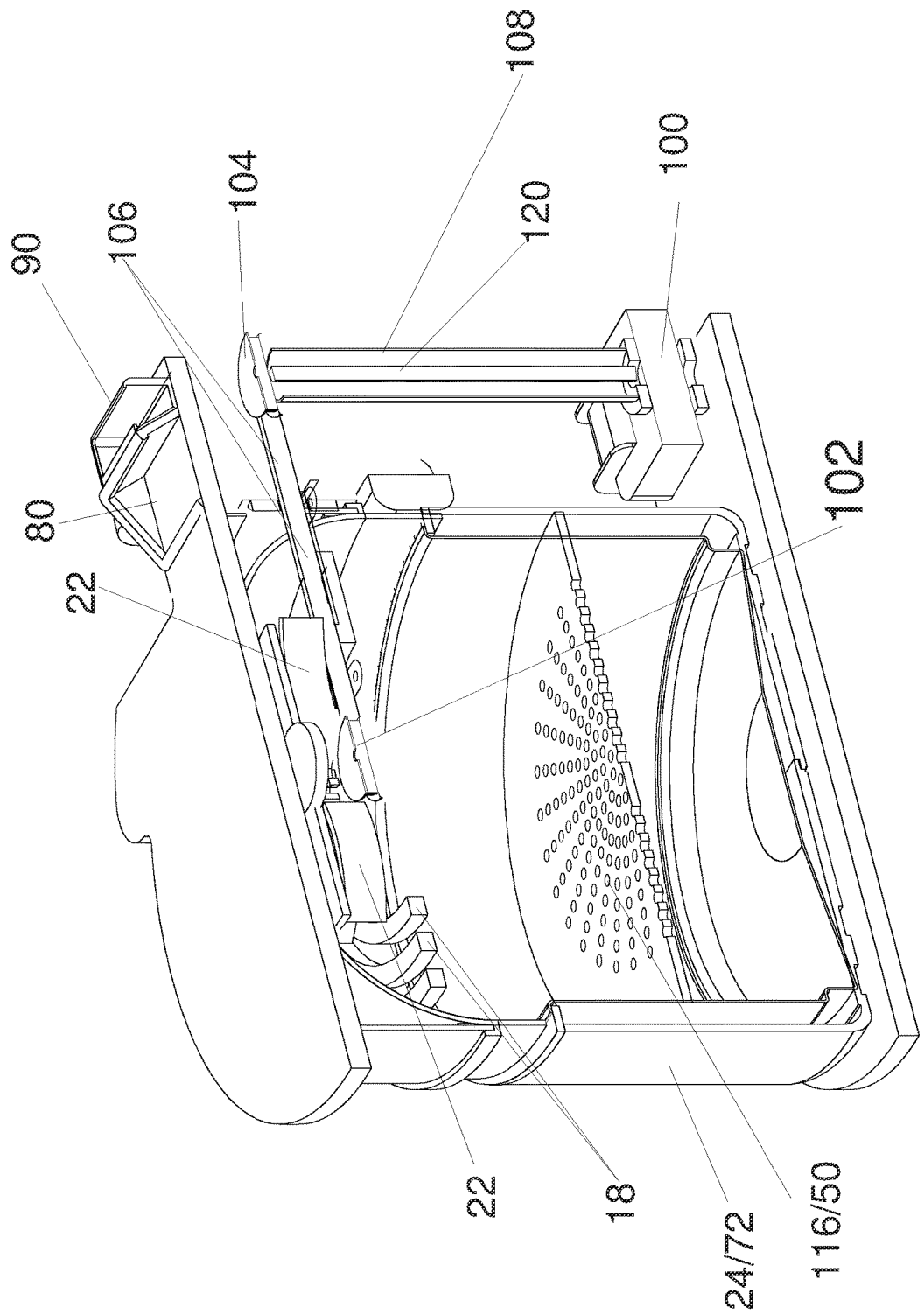

Referring now to FIG. 44, and embodiment very similar to that of 43 can be seen however pulleys 104 and belting/chain-sprocket(s) 106 are used to transmit at least a part of the motion and directional translation/change. It can be seen at this can be structurally housed at least in part by support posts/cantilever support posts 108.

Figure 45:
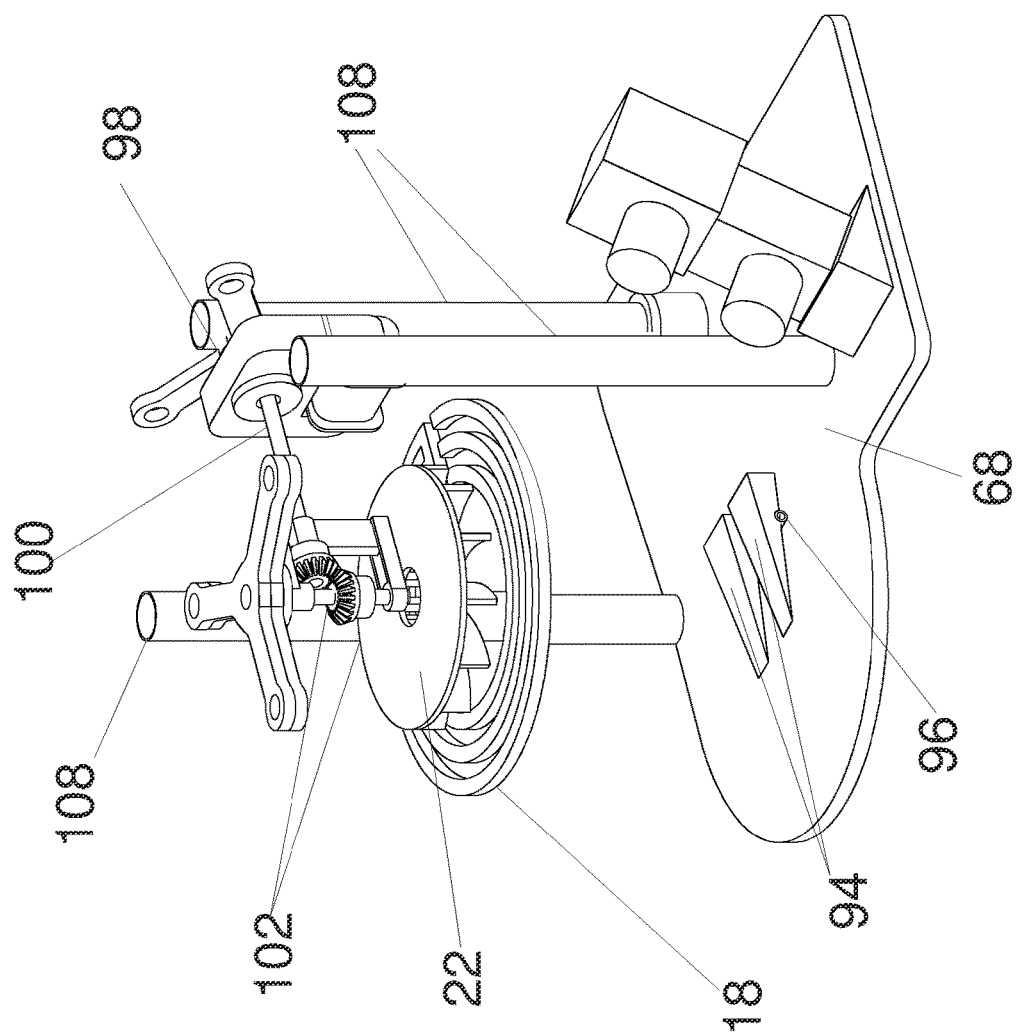

Referring now to FIG. 45, and embodiment substantially like that of FIG. 42 can be seen with many of the other elements removed for clarity. It can be seen how the motor is structurally rearward of the main hood unit and heater and rearward of the fan that the motor drives via shafting and bevel gears or a belt/chain arrangement.

Referring now to FIGS. 46 a and 46 b, the cooking lid/hood is optionally vertically translatable upon the cantilever support(s) so that the cooking vessel may be accessed in another and/or additional way as well as that a plurality of cooking vessels of varying heights may be used. Additionally, the cooking lid/hood may be affixed via a pivot/hinge to the cantilevering structure, making it so that the hood/lid may be flipped open to access/load cooking vessels can be seen. This flappable lid may include seals for pressure cooking applications as well as heaters and fans for air frying applications.

Figure 47:
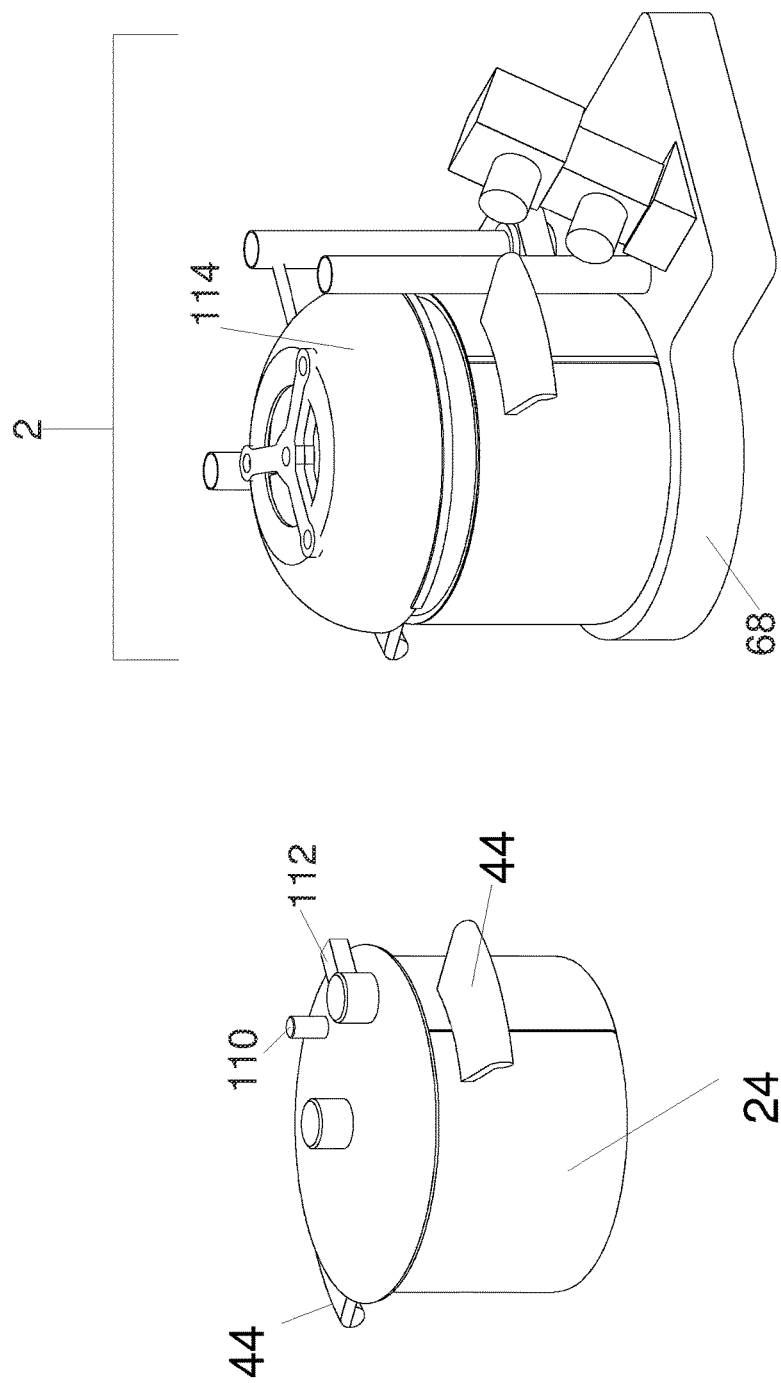

Referring now to FIG. 47, a base unit 68 that includes lower heating that may be induction resistive, or halogen etc. in nature is depicted. A cooking vessel, 24 is also depicted in a removed state, as well as a state with the main appliance and its base 68. In this embodiment cooking vessel 24 is a pressure cooker which is optionally/some embodiments non-powered, i.e. it has no internal heating elements. Cooking vessel 24 has a meeting lid 26 which may further include pressure indicator/relief valve 110, and beginning of cooking/end of cooking valve 112 which is used to seal the unit for cooking and then as a pressure release at the end of cooking. When cooker 24 is engaged with base unit 68, cooker 24 may be heated to bring it up to temperature and pressure. Hood area 114 of Main unit structure, 2 may selectively interact with his two valves/indicators electrically and/or electromechanically. Main unit 2, may sense the state of pressure within cooking vessel 24 by monitoring the position of pressure indicator 110 and make adjustments to temperature, inductive generated or other, to maintain the proper state of cooking. Furthermore, Main unit 2, may control pressure within cooking vessel 24, by selectively releasing pressure (quickly-continuously or in timed bursts or slowly-continuously) via relief valve 112, or using the override safety mechanism, if present, of pressure indicator 110. This control may be via a solenoid, a servo, and latching relay or other such electromechanical control interface. In this way cooking functions may be monitored and controlled in an advanced manner, whether or not a user is present, and furthermore, in some embodiments, a plurality of non-electrical pressure cookers, and lids may be used interchangeably with the base unit enabling advanced functionality. These control elements may be integrated in a variety of places such as support posts 108, and still be within the spirit and scope of the disclosed invention. Additionally, steam release deflector and condensate cup may be structurally integrated into the units cantilever/support posts. This has significant structural and functional results as the valves and pressure pot is fully washable/submersible with no onboard associated electricals resulting in greater versatility of pots used, and greater reliability, serviceability robustness and in cost to manufacture. It should also be appreciated how steaming functions as well as combo functions such as steam and then bake—or air fry have been enabled and this structure makes it so this can be done with a single countertop appliance and in a small vessel(s) for the home or individual restaurant servings. Additionally there may be a temperature probe integral to the pressure cooker, or it's lid, or there may be a sealed receptacle for a temperature probe that interacts with the main unit 2. This temperature probe may be in sealed orientation from the exterior to maintain pressure, but configured with a penetrating end to monitor the internal temperature of meats and other foodstuffs.

Figure 48:
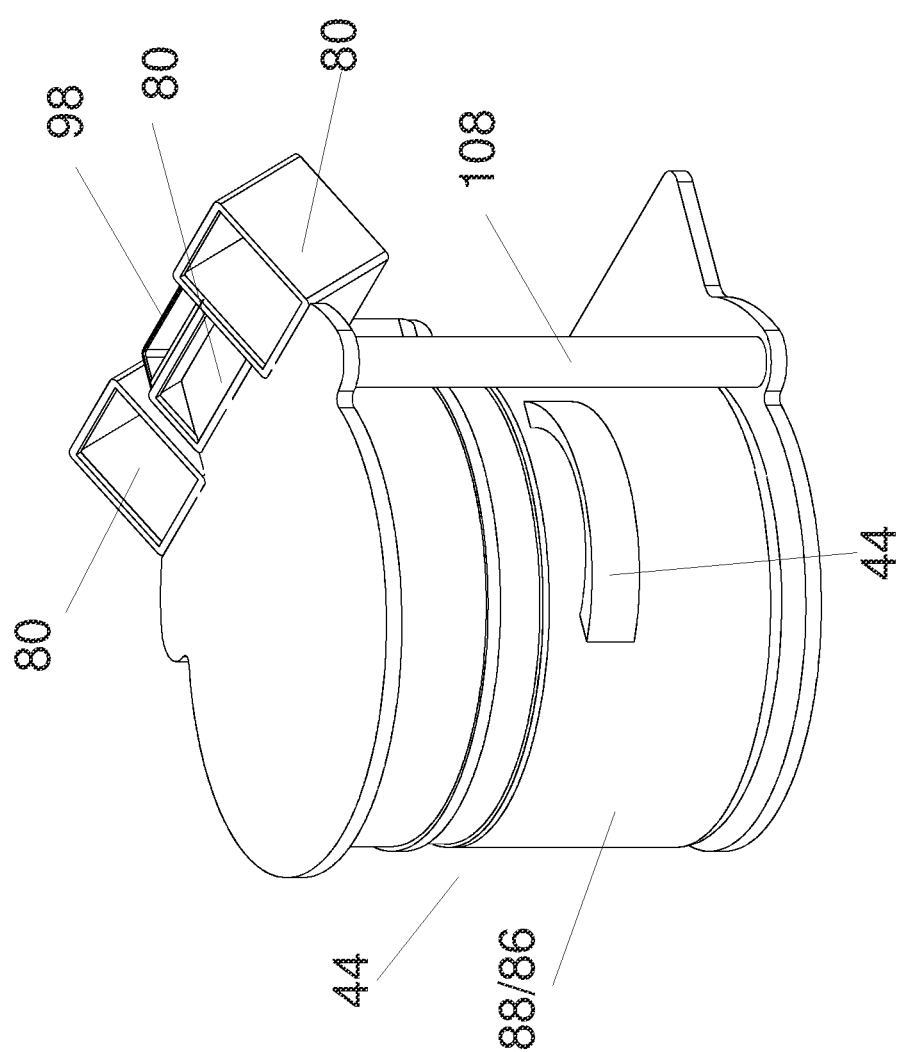

Referring to FIG. 44, configurations similar to that of figures FIGS. 38, views A, B and C already described. This view serves to further show that one or more elements may be made of "magnetically transparent" material in order to direct heating from an induction generator to specific areas with in the cooking vessel. In this case, the only element capable of being excited by the induction generator is food support 116/50. Outer, and (if applicable) inner pot are of nonferrous materials. And so with this Induction integration a grill/grid which uniquely transfers the heat to the grid, which may be elevated within the cooking vessel, for conduction grilling and associated marks and also the grid allows the air to pass through for baking/frying in both directions. Thus advanced heating functions, such as grilling, searing can occur on food support 116/50, which is/may be elevated within cooking vessel 24/72 with respect to its bottom interior surface, and food support 116/50 may include drain holes/air flow apertures to facilitate advanced cooking functions and at the same time may keep the exterior generally cool to the touch. Thus another embodiment depicted in FIG. 48 is that of a unit that is capable of heating on the bottom as well as from the top. Thus this is also illustrative of the structural unique function(s)n of "induction at distance" heating/cooking with the ability to oven-bake/air fry the contents/foodstuffs, and then further/optionally serve it in a temperature safe container.

And so it can be seen how these unique structures allow an insulated (plastic, or stainless steel) completely washable vessel to be used to brown/sauté and could use a sizzle insert/griddle surface that would be heated inductively allowing there to be no electrical or conductive (Heat) interface keeping the vessels exterior cool, and totally washable/submersible and also variable with regard to function. Additionally disclosed are structures and methods of cooking using a induction generator, a vessel disposed upon the induction generator and a lid on the vessel capable of generating a heated air stream. This air stream may be reversible. The induction generator may support a variety of vessels and optionally vessel heights.

Additionally, these embodiments as well as any and all others in this disclosure may include the registration and recognition of the various size cooking vessels that would alter cooking parameters based upon the vessel put upon it based on variables such as width/depth, or steam input etc. The vessels may be identified by tactile input (Braille bumps etc), RFID, QR coding, Bar coding, embedded RF chips or other identifying technology.

Furthermore advanced and a plurality of functions have been enabled: (of all embodiments)
1) Air fry
2) Convection oven
3) Fry/sauté without air flow around the food
4) Bake with air flow around the food
5) Bake without around the food
6) Slow cook
7) Pressure cook
8) Sous vide These embodiments and others represent a completely new cooking system where a vessel may act as a pan for searing, braising sautéing and that same vessel may function as an oven dry, relatively static or dynamic convection or or wet/steam.

Additionally disclosed is a unique structure for capitalizing on the magnetic flux created enabling Magnetic stirring to occur with induction. This has applications from sous vide, to air frying, to sautéing for other applications where food should be stirred or agitated for even cooking.

Of note are embodiments that have induction integration in combination with a sidesaddle structural orientation of at least some of the mechanicals such as FIG. 35; as this which orients magnetically problematic elements such as motors and resistive heaters out of the inductive path.

Figure 50:
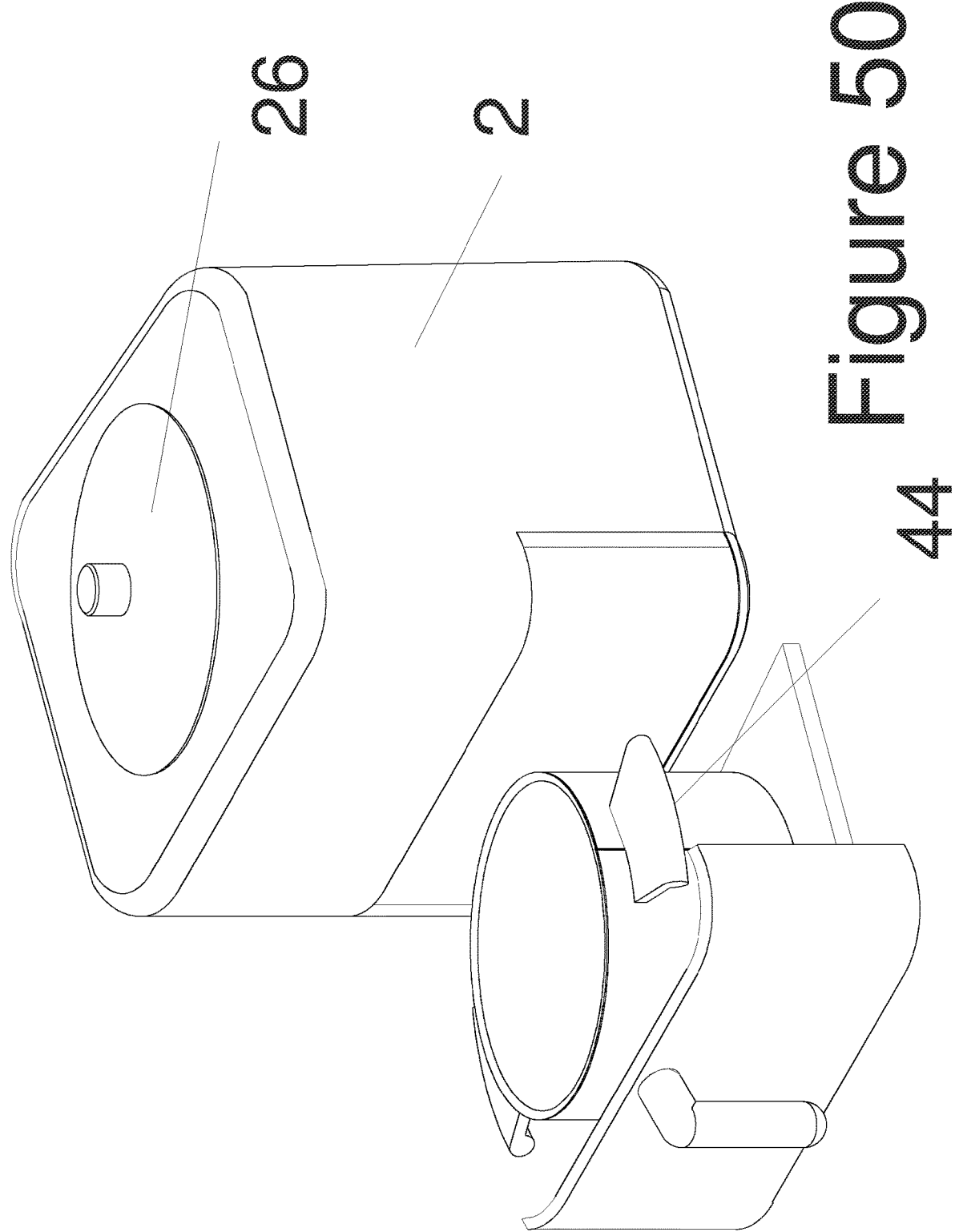

Referring to FIG. 50, another embodiment that shares some features of the embodiments of FIG. 24 can be seen. FIG. 50 depicts new structures that have been created to be conducive to serving, cleaning, or storing of leftovers. Additionally, multiple cooking/serving dishes may be used increasing the units capability and capacity. In this embodiment the cooking vessels and handles are contained within the main unit 2, during heating/cooking. Capability may be increased due to specialized sizes and shapes. Capacity may be realized in that multiple dishes may be cooked on/in the main unit sequentially and held in their respective cooking/serving dish. Yet at the same time the unitary, complete unit aesthetics are maintained while encouraging the frequent cleaning of the cooking vessel. FIG. 50 is also exemplary of a standard, known configuration, lacking the cantilevering and structural geometry to enable the functionality of other disclosed embodiments yet FIG. 50 does include the structural enablement of drop serve to table dishes/cooking vessels also described with regard to FIG. 24.

FIG. 51 depicts cooking vessel embodiments that may be selectively used with other disclosed embodiments. By referring to FIG. 51 and section B-B it can be seen that outer bowl 86 and inner bowl 88 may be made with an air space between thus forming a double wall insulative container. In some embodiments this space my be evacuated and made thus thermally insulative. However in another preferred embodiment, this double wall construct creates a further heat protective exterior by including a structured air flow via top vent holes 124, and/or bottom vent holes 124. The venting of the air space may be passive air flow or forced air flow via a fan etc. Thus further structurally enabling the exterior, 86 to stay cool to the touch while at the same time enabling the interior 88 to get hot for the heating/cooking of foodstuffs. And enables the interior 88 to be separately removable for ease of cleaning etc. These vent/apertures 124, may occur in just areas or around the periphery of the cooking vessel assembly. Feet as well as integrated trivets may be included in order to further make the vessels table ready and easy to hold/handle.

As depicted, a lid or lids may be included to make the units go from fridge to oven to table. These embodiments may also be combined with the already described drop dish embodiments that include quick release drop function enabling comfortable serving.

ABSTRACT OF THE DISCLOSURE

New and novel structures and ways to cook and serve foodstuffs have been disclosed. The items may be "foodstuffs" or other perishable items. The structure or method may include a means and methods to cook the food more evenly, more food concurrently and allow the user to see the food better as it is cooking and serve the food in the vessel it was cooked in, thus making fewer items to manipulate and clean.

I claim:
1. A device for heating and cooking of items comprising;
a) a hood structure including at least one fan blade and at least one heating element,
b) abase structure,
c) a vertical support structure extending vertically and defining a vertical axis from said base structure to said hood structure for supporting said hood structure at a position distal to said base,
d) a removable cooking vessel having a center from top plan view, defining a front, a back and a left and a right of said cooking vessel and further including two handles as a mirrored geometry of one another relative to said front and said back of said vessel and as a mirrored geometry of one another relative to said right and said left of said vessel, e) where said hood structure is substantially cantilevered above said removable cooking vessel allowing said two mirrored geometry handles to both be simultaneously disposed forward of said vertical support structure when said cooking vessel is positioned on said bas e structure, and where said cooking vessel is repositionable in a second position rotated generally 180 degrees with respect to said vertical axis, from said first position, f) and where said removable cooking vessel further includes a selectively removable lid for selectively closing off an open end of said removable cooking vessel when said removable cooking vessel is removed from said hood and said base structure, and where there is a lid support disposed on top of said hood structure with a shape that at least in part mirrors said separate lid, for selectively supporting and engaging with an edge of said separate lid when said lid is not disposed upon said cooking vessel.

2. A countertop device for heating and cooking of items comprising;

a) abase structure, b) at least one vertical support structure extending vertically from said base structure, c) a hood structure supported by said at least one vertical support structure, spaced from and cantilevered from said base structure, d) said hood structure capable of directing heated air in a downward direction generally from said hood towards said base structure, e) a removable cooking vessel comprising an outer shell made of a low heat coefficient material, and an inner cooking liner made of a high heat coefficient material, each, user separable from one another, having a center from top plan view, defining a front, a back and a left and a right of said cooking vessel, and further including two handles as mirrored geometries of one another relative to said front and said back of said vessel and as mirrored geometries of one another relative to said right and said left of said vessel, where each of said two handles are spaced generally 180 degrees from the other relative to said vessels center and where said two handles are connected to said outer shell, f) where when said removable cooking vessel is positioned between said hood and said base structure, a positional working relationship is defined between said hood-base structure and said removable cooking structure, where said two handles are simultaneously accessible by a user and said two handles may be in one of two alternate positional working relationship positions; where each of said two positional working relationship positions is defined as a rotation of said vessel about said vessels center generally 180 degrees to one another, g) and where said removable cooking vessel further includes a selectively removable lid for selectively closing off an open end of said removable cooking vessel when said removable cooking vessel is removed from said hood and said base structure, and where there is a lid support disposed on top of said hood structure with a shape that at least in part mirrors said separate lid, for selectively supporting and engaging with an edge of said separate lid when said lid is not disposed upon said cooking vessel.

3. A countertop device for heating and cooking of items comprising;

a) abase structure, b) at least one vertical support structure extending vertically from said base structure c) a hood structure capable of directing heated air in a downward direction generally from said hood towards said base structure, supported by said at least one vertical support structure, spaced from said base structure, said hood structure further defining a horizontal spatial envelope, d) a removable cooking vessel having a center from top plan view, defining a front, a back and a left and a right of said cooking vessel and further including two handles on two opposing sides of said removable cooking vessel where said handles are mirrored geometries of one another relative to said front and said back of said vessel and are mirrored geometries of one another relative to said right and said left of said vessel, e) where when said cooking vessel and said base structure are co-located in a working relationship, said cooking vessel may be structurally oriented in one of two positions relative to said base structure; where each of said two positions is rotated relative to one another generally by 180 degrees to one another, f) where when said removable cooking vessel is selectively positioned between said hood and said base structure, said two handles spatially extend laterally beyond said hood structures horizontal spatial envelope, g) and where said removable cooking vessel further includes a selectively removable lid for selectively closing off an open end of said removable cooking vessel when said removable cooking vessel is removed to a position out of said working relationship with said base structure, and there is a generally horizontal lid support on said device for selectively supporting and engaging an edge of said separate lid when said lid is not disposed upon said cooking vessel.

* * * * *